United States Patent
Honma

(10) Patent No.: US 12,299,355 B2
(45) Date of Patent: May 13, 2025

(54) CORE DESIGN APPARATUS, CORE DESIGN METHOD, AND PROGRAM

(71) Applicant: NIPPON STEEL CORPORATION, Tokyo (JP)

(72) Inventor: Rei Honma, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/724,149

(22) PCT Filed: Feb. 21, 2023

(86) PCT No.: PCT/JP2023/006141
§ 371 (c)(1),
(2) Date: Jun. 25, 2024

(87) PCT Pub. No.: WO2023/167050
PCT Pub. Date: Sep. 7, 2023

(65) Prior Publication Data
US 2025/0061243 A1    Feb. 20, 2025

(30) Foreign Application Priority Data
Mar. 1, 2022  (JP) .................................. 2022-031019

(51) Int. Cl.
*G06F 30/17*    (2020.01)
*G06F 30/20*    (2020.01)

(52) U.S. Cl.
CPC .............. *G06F 30/17* (2020.01); *G06F 30/20* (2020.01)

(58) Field of Classification Search
CPC ................................. G06F 30/17; G06F 30/20
See application file for complete search history.

(56) References Cited

U.S. PATENT DOCUMENTS

| | | | |
|---|---|---|---|
| 5,710,718 A | 1/1998 | Kamegawa et al. | |
| 2017/0148228 A1* | 5/2017 | Santhanam | ............. G06T 19/20 |
| 2019/0019331 A1* | 1/2019 | Alliez | .................. G06T 17/205 |
| 2020/0143009 A1* | 5/2020 | Schmidt | ................. G06F 30/23 |

FOREIGN PATENT DOCUMENTS

| | | |
|---|---|---|
| JP | 2021-41792 A | 3/2021 |
| JP | 2021-114099 A | 8/2021 |
| WO | WO 94/16877 | 8/1994 |

OTHER PUBLICATIONS

Decision to Grant issued in JP Application No. 2024-504631 on Aug. 27, 2024, with English translation.
Notice of Reasons for Refusal issued in JP Application No. 2024-504631 on Jul. 16, 2024, with English translation.

* cited by examiner

*Primary Examiner* — Chuen-Meei Gan
(74) *Attorney, Agent, or Firm* — Birch, Stewart, Kolasch & Birch, LLP

(57) ABSTRACT

A core design device (100) acquires an application parameter including a parameter indicating an application method of a deformation pattern (310a, 310b). The core device (100) changes a shape of a design target element by applying the deformation pattern (310a, 310b) to the design target element according to the application method included in the application parameter. The core design apparatus (100) determines a shape of a core based on a value indicating a characteristic of a device when the device including the core in which the shape of the design target element has been changed is operated.

19 Claims, 11 Drawing Sheets

F I G. 2A
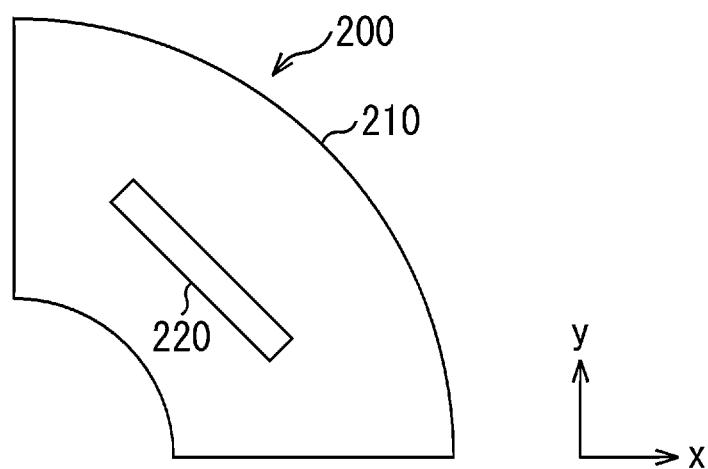
F I G. 2B
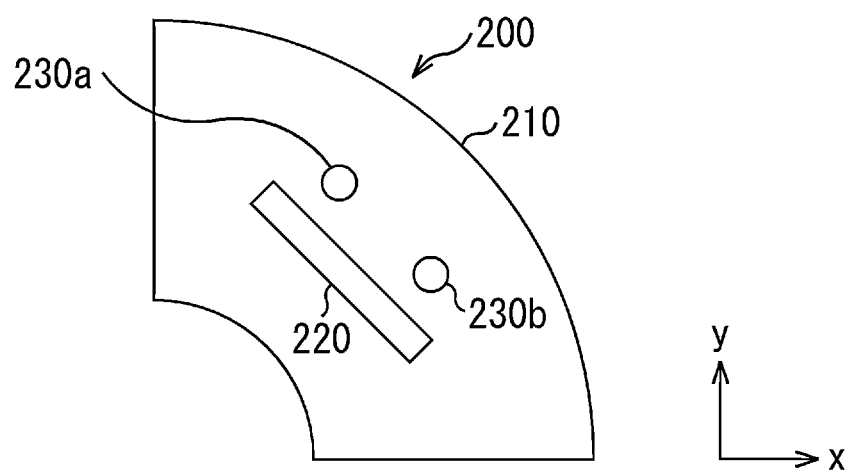

F I G. 4A
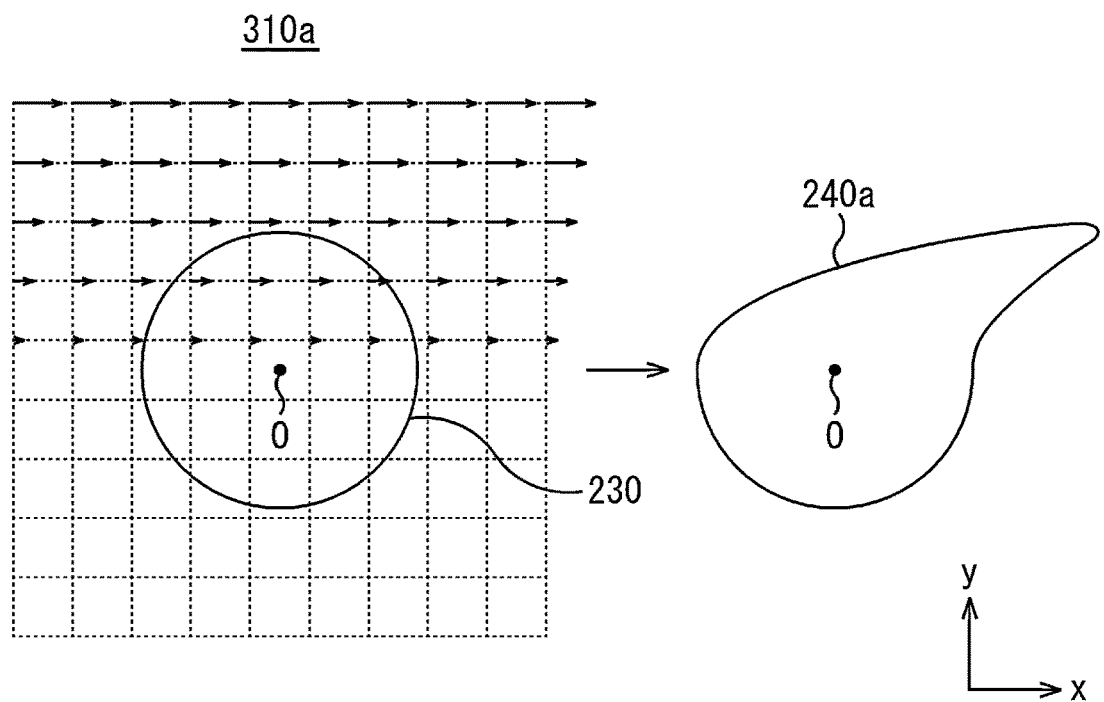
F I G. 4B
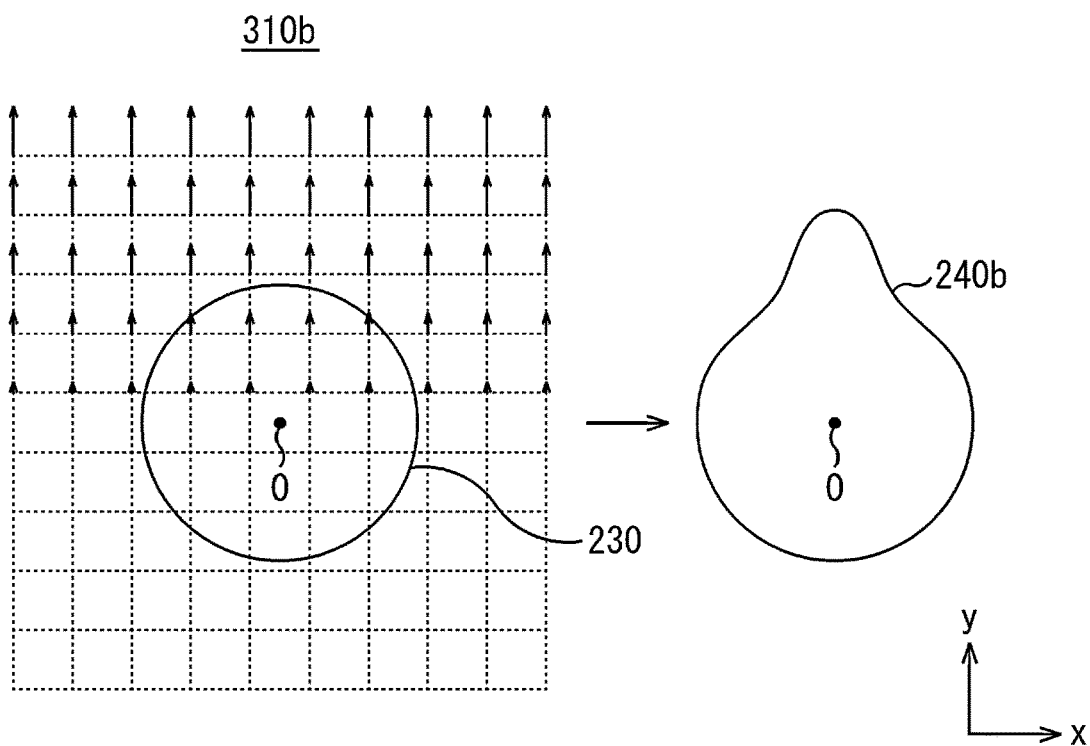

F I G. 6A
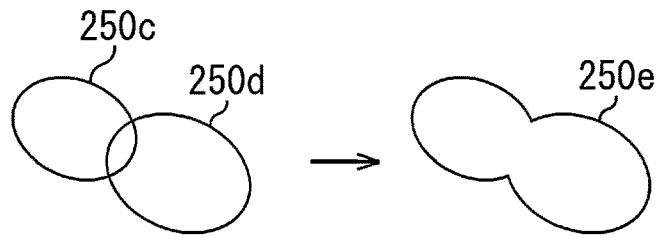
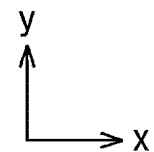
F I G. 6B
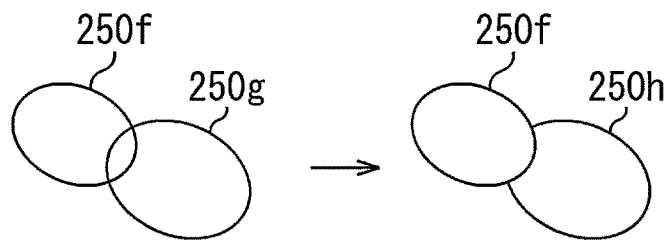
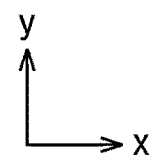
F I G. 6C
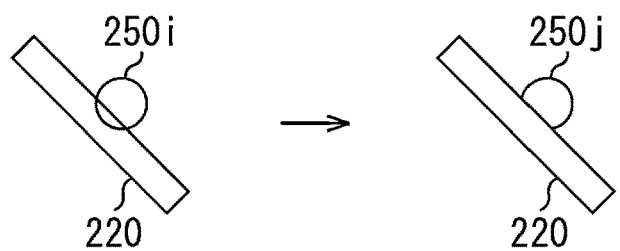
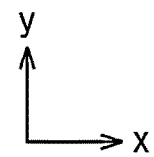
F I G. 6D
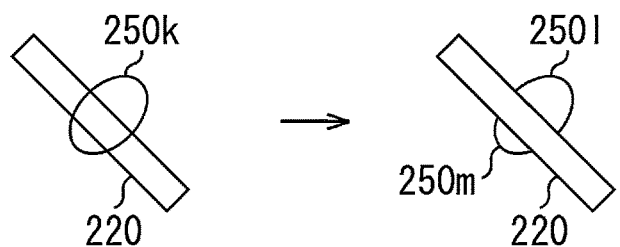
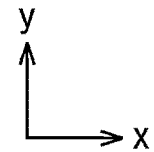

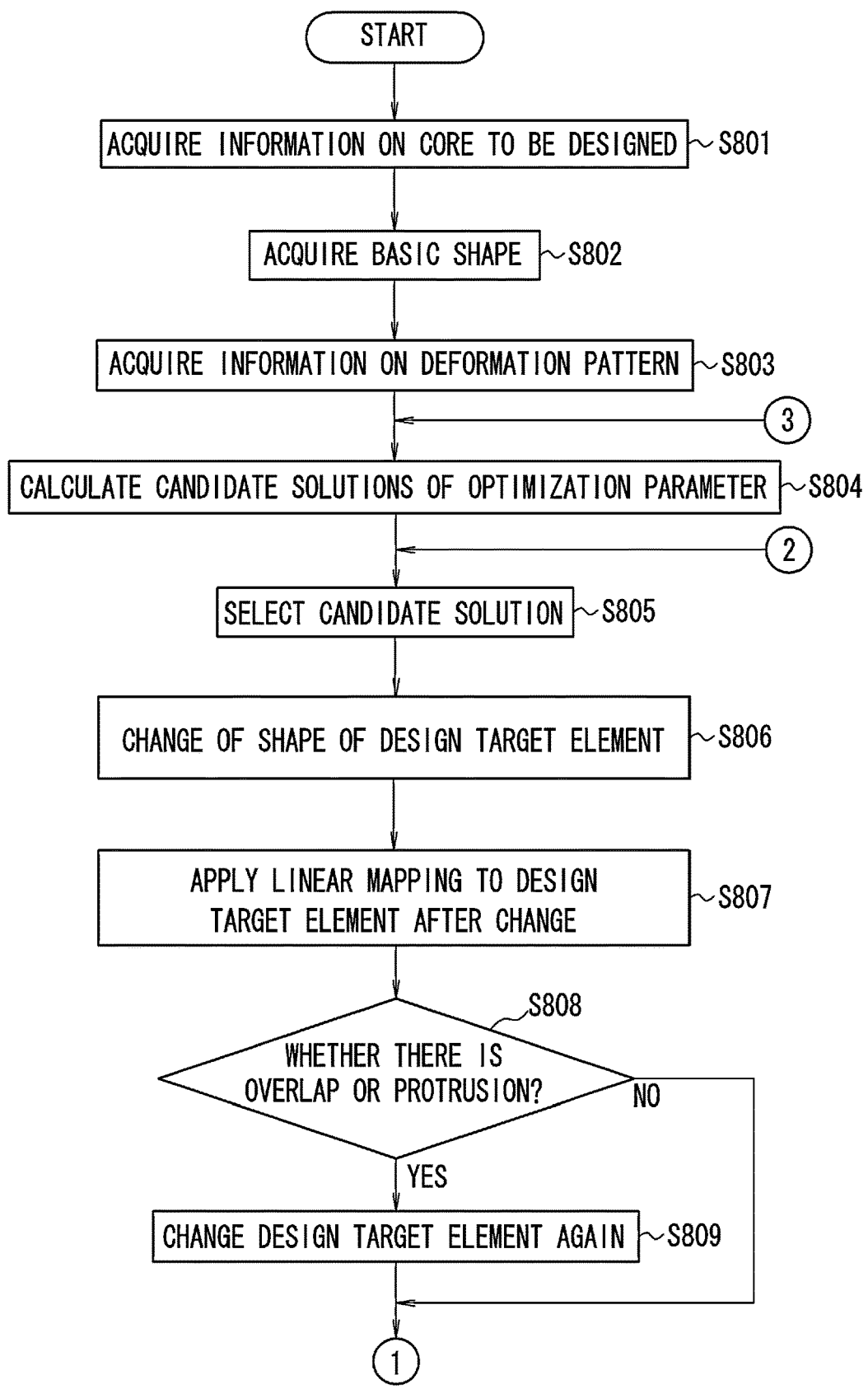

CORE DESIGN APPARATUS, CORE DESIGN METHOD, AND PROGRAM

TECHNICAL FIELD

The present invention relates to a core design apparatus, a core design method, and a program, and is particularly suitable for being used for designing cores. This application is based upon and claims the benefit of priority of the prior Japanese Patent Application No. 2022-031019, filed on Mar. 1, 2022, the entire contents of which are incorporated herein by reference.

BACKGROUND ART

In a device including a core (iron core) such as a motor, for example, the design of the core has a significant impact on the performance of the device. For example, the shape of a rotor of an IPMSM (Interior Permanent Magnet Synchronous Motor) is becoming more complex. In such a rotor, the magnetic flux can be controlled by appropriately arranging flux barriers around permanent magnets embedded in an iron core. Therefore, it is possible to improve torque characteristics, reduce iron loss, and alleviate stress.

Thus, the present inventors made the invention described in Patent Literature 1. In the invention described in Patent Literature 1, a basic shape of at least one design target element is set for a design region, which is a design target region of the core. Then, an optimal solution for mapping to be applied to the basic shape of the design target element is calculated using an optimization problem algorithm. Patent Literature 1 has described that the mapping to be applied to the basic shape of the design target element can be homeomorphic nonlinear mapping as well as linear mapping. If the mapping to be applied to the basic shape of the design target element is the homeomorphic nonlinear mapping, it becomes possible to widen a search range when searching for an optimal shape of the core compared to the case of the linear mapping.

CITATION LIST

Patent Literature

Patent Literature 1: Japanese Laid-open Patent Publication No. 2021-114099

SUMMARY OF INVENTION

Technical Problem

However, Patent Literature 1 has not disclosed a specific method for the case where the mapping to be applied to the basic shape of the design target element is the nonlinear mapping. When the nonlinear mapping is applied to the basic shape of the design target element, the shape of the design target element may become excessively complex. Therefore, a shape that is not easily fabricated or a practically impossible shape may be obtained. On the other hand, when the shape obtained by applying the nonlinear mapping to the basic shape of the design target element is too simple, it may be impossible to design the shape of a core that sufficiently improves the performance of the device. Therefore, it is desirable to search for the shape of a core that improves the performance of the device from within a search range as wide as possible within a feasible range.

The present invention has been made in consideration of the above problems, and an object thereof is to search for the shape of a core that improves the performance of a device by using a wider range as a search region within a feasible range.

Solution to Problem

The core design apparatus of the present invention is a core design apparatus for performing calculations related to design of a shape of a core, the core design apparatus including; a basic shape acquisition part configured to acquire a basic shape of a design target element of the core; and a core shape determination part configured to determine a shape of the core by changing a shape of the design target element of the core from the basic shape, in which the core shape determination part includes: a deformation pattern acquisition part that acquires a deformation pattern indicating content of deformation to the shape of the design target element; a parameter acquisition part that acquires an application parameter; a design target element change part that changes the shape of the design target element by using the deformation pattern and the application parameter; a characteristic value calculation part that calculates a value indicating a characteristic of a device when the device including the core in which the shape of the design target element has been changed is operated; and a determination part that determines the shape of the core based on the value indicating the characteristic of the device, in which the application parameter includes a parameter indicating an application method of the deformation pattern when the deformation pattern is applied to the design target element, in which the design target element change part applies nonlinear mapping to the design target element by applying the deformation pattern to the design target element according to the application method, in which the deformation pattern indicates displacement at each position in a relative coordinate system on the basic shape of the design target element, and at least one of the deformation patterns indicates content of deformation in which shapes before and after change are brought into a homeomorphic mapping relationship.

the core design method of the present invention is a core design method of performing calculations related to design of a shape of a core, the core design method including; a basic shape acquisition step of acquiring a basic shape of a design target element of the core; and a core shape determination step of determining a shape of the core by changing a shape of the design target element of the core from the basic shape, in which the core shape determination step includes: a deformation pattern acquisition step of acquiring a deformation pattern indicating content of deformation to the shape of the design target element; a parameter acquisition step of acquiring an application parameter; a design target element change step of changing the shape of the design target element by using the deformation pattern and the application parameter; a characteristic value calculation step of calculating a value indicating a characteristic of a device when the device including the core in which the shape of the design target element has been changed is operated; and a determination step of determining the shape of the core based on the value indicating the characteristic of the device, in which the application parameter includes a parameter indicating an application method of the deformation pattern when the deformation pattern is applied to the design target element, in which the design target element change step applies nonlinear mapping to the design target element by applying the deformation pattern to the design target element according to the application method, in which the deformation pattern indicates displacement at each position in a relative coordinate system on the basic shape of the design target element, and at least one of the deformation patterns indicates content of deformation in which shapes before and after change are brought into a homeomorphic mapping relationship.

The program of the present invention is a program for causing a computer to function as each part of the core design apparatus.

BRIEF DESCRIPTION OF DRAWINGS

FIG. 2A is a view conceptually illustrating one example of a process of design of a core before a design target element is set.

FIG. 2B is a view illustrating one example of an element of the core in which a design target element with a basic shape is set.

FIG. 4A is a view conceptually illustrating a first example of how a design target element with a basic shape is deformed.

FIG. 4B is a view conceptually illustrating a second example of how the design target element with the basic shape is deformed.

FIG. 6A is a view that explains a first example of overlap.

FIG. 6B is a view that explains a second example of the overlap.

FIG. 6C is a view that explains a third example of the overlap.

FIG. 6D is a view that explains a fourth example of the overlap.

FIG. 8A is a flowchart that explains one example of a core design method.

DESCRIPTION OF EMBODIMENTS

Hereinafter, there will be explained one embodiment of the present invention with reference to the drawings.

Incidentally, the fact that objects to be compared such as lengths, positions, sizes, and intervals, are the same includes the case where they are strictly the same, as well as the case where they are different within a range that does not depart from the gist of the invention (for example, the case where they are different within a tolerance range defined at the time of design). Further, in each of the drawings, the configuration is simplified or abbreviated as necessary for notation and explanation. Further, in each of the drawings, x-y coordinates are used to indicate the orientation relationship in each drawing. The origin of the x-y coordinates is not necessarily the position illustrated in each drawing.

Figure 1:
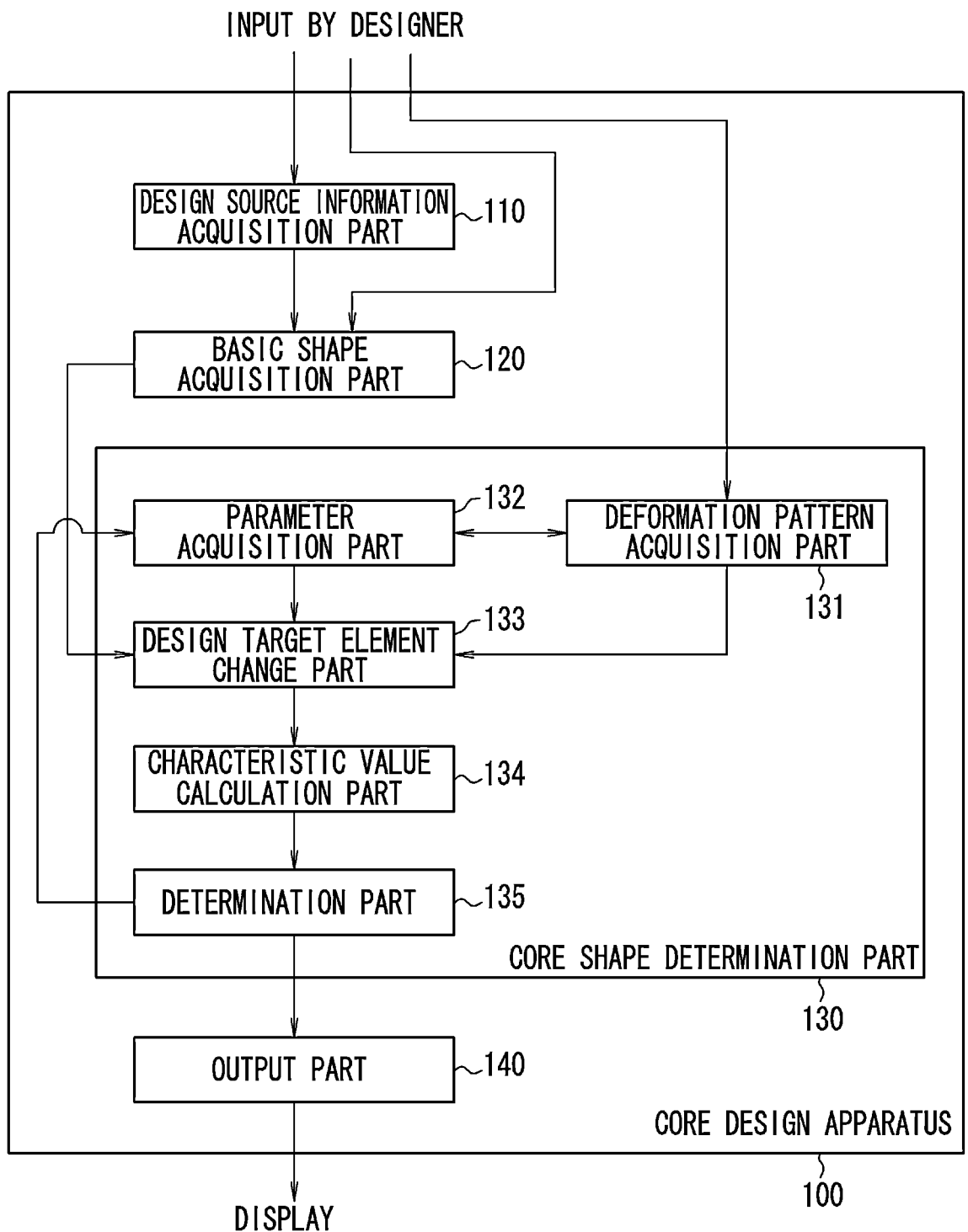
FIG. 1 is a diagram illustrating one example of a functional configuration of a core design apparatus.

FIG. 1 is a diagram illustrating one example of a functional configuration of a core design apparatus 100. The hardware of the core design apparatus 100 is fabricated by using, for example, an information processing device (computer device) including a processor, a main memory, an auxiliary memory, and various interfaces, or by using dedicated hardware.

[Core Design Apparatus 100]

The core design apparatus 100 performs calculations related to design of a shape of a core. Here, the elements of a core include, for example, an iron core, a material object (part or material) arranged inside the iron core, a space formed inside the iron core, a space in a recess at the outer circumference of the iron core, and a space in a recess at the inner circumference of the iron core. A part of the material object (part or material) arranged inside the iron core may be exposed on the surface of the iron core. As long as in addition to the region of the iron core (region of a magnetic material such as electromagnetic steel sheet), at least one of the following: the region of a material object (region of a part or material) arranged inside the iron core, the space formed inside the iron core, the space of a recess at the outer circumference of the iron core, and the space of a recess at the inner circumference of the iron core is the element of the core, all of them do not need to be the element of the core.

In FIG. 1, the core design apparatus 100 includes a design source information acquisition part 110, a basic shape acquisition part 120, a core shape determination part 130, and an output part 140.

<Design Source Information Acquisition Part 110>

The design source information acquisition part 110 acquires information on a core to be designed. The information on the core to be designed is information that needs to be prepared in advance for the core design apparatus 100 to perform calculations related to design of the core. In this embodiment, there is explained, as an example, the case where the design source information acquisition part 110 acquires, as the information on the core to be designed, information including information on a design region, which is a design target region, of the core, information on elements of the core other than a design target element, and physical property values of each element of the core. The design target element is, among the previously-described elements of the core, the element that requires design of attributes such as shape, position, and size. The design target element is determined by a designer or the like. The information on the design region is information necessary for uniquely specifying the design region, and includes information that can uniquely specify the shape, size, and position of the design region, for example. Similarly, the information on the elements of the core other than the design target element is information necessary for uniquely specifying the regions of the elements of the core other than the design target element, and includes information that can uniquely specify the shape, size, and position of the elements of the core other than the design target element.

FIG. 2A and FIG. 2B are views each conceptually illustrating one example of the process of design of the core before the shape of the design target element is changed. In this embodiment, there is explained, as an example, the case where the shape of a rotor of an IPMSM is designed. Further, in this embodiment, there is explained, as an example, the case where a two-dimensional shape of a cross section cut perpendicularly to the center line of the IPMSM is designed. In FIG. 2A and FIG. 2B, the cross section cut perpendicular to the center line of the IPMSM is the x-y plane.

In this embodiment, there is explained, as an example, the case where the core of the rotor of the IPMSM includes an iron core, a permanent magnet installed in the iron core, and a flux barrier formed in the iron core. Therefore, in this embodiment, the element of the core of the rotor includes the iron core, the permanent magnet, and the flux barrier. The regions illustrated in FIGS. 2A and 2B each are a cross section of the rotor of the IPMSM, and are one of four regions obtained by dividing the cross section cut perpendicular to the center line of the IPMSM into four equal parts. It is set that these four regions have a 4-fold symmetrical relationship. Therefore, by designing one region of these four regions, the entire cross section of the rotor of the IPMSM, which is cut perpendicular to the center line of the IPMSM, can be designed. That is, in one region of these four regions, the iron core, the permanent magnet, and the flux barrier are designed. Then, the iron core, the permanent magnet, and the flux barrier that are designed in one region of the four regions are rotated by 90°, 180°, and 270° about the center line of the IPMSM as the rotation axis. In this way, the entire cross section of the rotor of the IPMSM, which is cut perpendicular to the center line of the IPMSM, can be designed. Incidentally, the flux barrier is set to be a space (air). However, the flux barrier does not have to be a space. For example, the flux barrier may be formed of a nonmagnetic material.

In this embodiment, there is explained, as an example, the case where the flux barrier is the design target element among these elements of the core. However, in this embodiment, an explanation in consideration of the fact that the permanent magnet is the design target element in addition to the flux barrier is also added. Thus, when designing the rotor of the IPMSM, for example, at least one of the flux barrier and the permanent magnet can be set as the design target element.

FIG. 2A is a view illustrating one example of the element of the core before the design target element is set.

In the example illustrated in FIG. 2A, it is set that a design region 200 is a region surrounded by the outer edge of a region 210 of the iron core. As illustrated in FIG. 2A, the outer edge of the region 210 of the core has an annular sector shape with a central angle of 90°. In this embodiment, there is explained, as an example, the case where the coordinates of the region surrounded by the outer edge of the region 210 of the iron core are included in the information on the design region 200. The design source information acquisition part 110 acquires such information on the design region 200 and sets it in the main memory (working area). Further, the design source information acquisition part 110 acquires identification information ID1 intended for identifying the design region 200 from other regions and sets it for each coordinate of the design region 200. In the following explanation, the region 210 of the iron core is referred to as an iron core 210 as necessary.

In the example illustrated in FIG. 2A, it is set that the element of the core other than the design target element is a permanent magnet. Therefore, in the example illustrated in FIG. 2A, the region of the element of the core other than the design target element is the region surrounded by the outer edge of a region 220 of the permanent magnet. As illustrated in FIG. 2A, the outer edge of the region 220 of the permanent magnet has a rectangular shape. In this embodiment, there is explained, as an example, the case where the coordinates of the region surrounded by the outer edge of the region of the element of the core other than the design target element (region 220 of the permanent magnet) are information on the element of the core other than the design target element. The design source information acquisition part 110 acquires such information on the region 220 of the permanent magnet and sets it for the design region 200. Further, the design source information acquisition part 110 also acquires identification information ID2 intended for identifying the region of the element of the core other than the design target element from other elements (regions) and sets it for each coordinate of the region of the element of the core other than the design target element. Incidentally, when there are a plurality of types of elements of the core other than the design target element, the design source information acquisition part 110 sets different identification information ID2 for each type of the element of the core other than the design target element. In the following explanation, the region of the element of the core other than the design target element is referred to as an element of the core other than the design target element as necessary, and the region 220 of the permanent magnet is referred to as a permanent magnet 220 as necessary.

Further, the design source information acquisition part 110 acquires identification information ID3 intended for identifying the design target element from other elements (region). Incidentally, when there are a plurality of types of design target elements, the design source information acquisition part 110 acquires different identification information ID3 for each type of the design target element. As described previously, in this embodiment, there is explained, as an example, the case where the flux barrier formed in the iron core of the rotor of the IPMSM is the design target element. At the stage illustrated in FIG. 2A, no flux barrier is set in the iron core 210. Therefore, at the stage illustrated in FIG. 2A, the identification information ID3 is not set for the iron core 210.

Further, the design source information acquisition part 110 acquires information indicating a physical property value of each element of the core. In the examples illustrated in FIG. 2A and FIG. 2B, the physical property value of each element of the core includes a physical property value of a magnetic material such as an electromagnetic steel sheet that forms the iron core 210, a physical property value of the permanent magnet 220, and a physical property value of the flux barrier (air or nonmagnetic material) being one example of the design target element.

In this embodiment, there is explained, as an example, the case where a designer inputs the information on the design region 200, the information on the element of the core other than the design target element, the information indicating the physical property value of each element of the core, and the identification information ID1 to ID3 to the core design apparatus 100 by operating a user interface of the core design apparatus 100. In this case, the design source information acquisition part 110 acquires pieces of the information input to the core design apparatus 100 via the user interface of the core design apparatus 100, for example. However, the method by which the design source information acquisition part 110 acquires the information is not limited to such a method. For example, an external device such as a computer connected to the core design apparatus 100 via a communication network may transmit pieces of the information to the core design apparatus 100, and the design source information acquisition part 110 may acquire pieces of the information by receiving them via a communication interface. The design source information acquisition part 110 may acquire pieces of the information from the memory included in the core design apparatus 100.

Incidentally, the identification information ID1 to ID3 may be generated automatically by the design source information acquisition part 110.

<Basic Shape Acquisition Part 120>

The basic shape acquisition part 120 acquires information on the basic shape of the design target element and sets the design target element with the basic shape for the design region 200. The information on the basic shape of the design target element includes information that can uniquely specify the size and initial position of the design target element in addition to its specific shape. In this embodiment, there is explained, as an example, the case where the coordinates of each position of the outer edge of the region of the design target element with the basic shape are included in the information on the basic shape of the design target element. The basic shape is, for example, the shape assumed as the shape of the design target element. The basic shape is preferably a simple shape such as a circle or rectangle to inhibit a final calculated shape from becoming excessively complex. The number of basic shapes is arbitrary and may be one, two, three, or more. When a plurality of basic shapes are set, the respective basic shapes may be the same shape or different shapes. The positions and sizes of the basic shapes are not limited as long as the basic shapes are positioned within the design region 200. When a plurality of basic shapes are set, the positions of the plural basic shapes are positions separated from each other.

As described previously, in this embodiment, there is explained, as an example, the case where the design target element is the flux barrier. In the rotor of the IPMSM, the iron core 210 is not surrounded by the flux barrier (namely, the iron core does not float within the flux barrier). Therefore, the basic shape of the design target element is preferably set so that the element different from the design target element in type is not included inside the design target element.

FIG. 2B is a view illustrating one example of the element of the core in which the design target element with the basic shape is set.

FIG. 2B illustrates, as an example, the case where two basic shapes are set at positions separated from each other as the basic shape of the design target element. The basic shape acquisition part 120 sets coordinates of regions 230*a*, 230*b* of the design target element with the basic shape for the design region 200. The basic shape acquisition part 120 changes the identification information ID1 set for each coordinate of the regions 230*a*, 230*b* of the design target element with the basic shape to the identification information ID3 intended for identifying the region of the design target element from other regions. In the following explanation, the regions 230*a*, 230*b* of the design target element with the basic shape are referred to as design target elements 230*a*, 230*b* with the basic shape as necessary.

In this embodiment, there is explained, as an example, the case where the designer inputs information on the design target elements 230*a*, 230*b* with the basic shape to the core design apparatus 100 by operating the user interface of the core design apparatus 100. The basic shape acquisition part 120 acquires the information on the design target elements 230*a*, 230*b* with the basic shape, which are input to the core design apparatus 100 via the user interface of the core design apparatus 100, for example. More specifically, for example, the basic shape acquisition part 120 displays on a computer display a graphical user interface (GUI) that includes an image of an element of the core illustrated in FIG. 2A. In this GUI, it is set that of the design region 200, the regions other than the permanent magnet 220 can be designated in the image of the element of the core by operating the user interface of the core design apparatus 100. By making such designations, the designer inputs the information on the design target elements 230*a*, 230*b* with the basic shape to the core design apparatus 100.

However, the method of acquiring the information on the design target elements 230*a*, 230*b* with the basic shape by the basic shape acquisition part 120 is not limited to such a method. For example, the previously-described external device may transmit the information on the design target elements 230*a*, 230*b* with the basic shape to the core design apparatus 100, and the basic shape acquisition part 120 may acquire the information on the design target elements 230*a*, 230*b* with the basic shape by receiving it via the communication interface. The basic shape acquisition part 120 may acquire the information on the design target elements 230*a*, 230*b* from the memory included in the core design apparatus 100.

<Core Shape Determination Part 130>

The core shape determination part 130 determines the shape of the core. In this embodiment, there is explained, as an example, the case where the core shape determination part 130 determines the shape, position, size, and the like of the design target elements 230*a*, 230*b* in the design region 200 by changing the shapes of the design target elements 230*a*, 230*b* from their basic shape. Further, in this embodiment, there is explained, as an example, the case where the core shape determination part 130 includes a deformation pattern acquisition part 131, a parameter acquisition part 132, a design target element change part 133, a characteristic value calculation part 134, and a determination part 135.

<<Deformation Pattern Acquisition Part 131>>

The deformation pattern acquisition part 131 acquires a deformation pattern that indicates the content of deformation to the shape of the design target element. The deformation pattern indicates the displacement at each position in a relative coordinate system on the basic shape of the design target element. Further, at least one or more types of deformation patterns can be acquired, and at least one of them indicates the content of the deformation in which the shapes before and after change are brought into a homeomorphic mapping relationship. One example of the deformation pattern is explained below.

As described in the section of "TECHNICAL PROBLEM," when the nonlinear mapping is applied to the basic shape of the design target element, the shape of the design target element may become excessively complex. In this case, the shapes before and after deformation may not be brought into a homeomorphic mapping (topological equivalence) relationship. On the other hand, when the shape obtained by applying the nonlinear mapping to the basic shape of the design target element is too simple, it may no longer be possible to design the shape that improves the performance of the device as the shape of the core.

Here, linear mapping is mapping that satisfies additivity and homogeneity of degree one. The nonlinear mapping is mapping that is not the linear mapping. The homeomorphic mapping is mapping that satisfies the following conditions: the mapping between two topological spaces is bijection and continuous mapping, and inverse mapping thereof is continuous mapping. When the homeomorphic mapping exists, two topological spaces are homeomorphic. Incidentally, the concepts of linear mapping, nonlinear mapping, and homeomorphic mapping are the same as general concepts in the field of mathematics.

When the nonlinear mapping is applied to the design target element, it is necessary to express the nonlinear mapping using certain parameters. Therefore, it is desirable to use parameters that achieve both preservation of the homeomorphic property of the mapping and ensuring the arbitrariness in the shape within a range assumed as the core. Regarding this point, Patent Literature 1 has not disclosed any specific parameters. Thus, the present inventors conceived the idea of preparing a deformation pattern that expresses the displacement of each position in the relative coordinate system on the basic shape of the design target element, and then searching for an application method of the deformation pattern such that the characteristic of the device (IPMSM in this embodiment) are improved. In this way, the basic shape of the design target element can be changed flexibly. Therefore, it is possible to search for the shape of the core that improves the performance of the device using, as a search region, a wider range than that in the technique described in Patent Literature 1 within a feasible range. Further, by changing the shape of the design target element with the deformation pattern, it is possible to gradually deform the design target element. Therefore, by repeatedly applying the deformation pattern to the design target element (namely, repeatedly changing the shape of the design target element with the content indicated in deformation patterns $310a$, $310b$), the shape of the design target element that improves the characteristic of the device (IPMSM in this embodiment) within the range assumed as the core can be searched for from within a search region in a wide range.

Further, the present inventors conceived the idea of making the content of the deformation indicated in the deformation pattern the content of the deformation in which the shapes before and after change are brought into a homeomorphic mapping relationship, thereby achieving both preservation of the homeomorphic property of the mapping and ensuring the arbitrariness in the shape within the range assumed as the core.

If the content of the deformation indicated in the deformation pattern is made the content of the deformation in which the shapes before and after change are brought into a homeomorphic mapping relationship, then by changing the shape of the design target element with the deformation pattern, the design target elements before and after deformation are brought into a homeomorphic mapping relationship. Thus, by repeatedly applying such a deformation pattern to the design target element (namely, repeatedly changing the shape of the design target element with the content indicated in the deformation patterns $310a$, $310b$), it becomes possible to search for the shape of the design target element that improves the characteristic of the device (IPMSM in this embodiment) within the range assumed as the core from within a search region in a wide range, while preserving the homeomorphic property of the design target elements before and after deformation.

If the design target elements before and after deformation are not in a homeomorphic mapping relationship, for example, the design target element after deformation may be twisted to include an intersection point (for example, a figure of 8 in Arabic numerals may be formed) with respect to the design target element before deformation. Further, if the design target elements before and after deformation are not in a homeomorphic mapping relationship, for example, one design target element before deformation may become a large number of design target elements. For example, when the design target element is a flux barrier, a core including a large number of flux barriers may be designed. On the other hand, for example, when changing a circle to a polygon, changing the number of corners of a polygon, changing a bend point to a curve, and changing the curvature of a curved portion are executed, the design target elements before and after deformation are in a homeomorphic mapping relationship. Thus, if the design target element is deformed so that the design target elements before and after deformation are brought into a homeomorphic mapping relationship, it is possible to inhibit the design of cores that are not easy or substantially impossible to manufacture and the design of cores that do not satisfy performance (for example, mechanical performance and magnetic performance), which is preferable. However, even if the design target elements before and after deformation are not in a homeomorphic mapping relationship, there may be cases where the core after design can be manufactured and satisfies the performance. For example, a large number of flux barriers may be allowed as long as the number is not excessive. Therefore, the design target elements before and after deformation do not necessarily have to be in a homeomorphic mapping relationship.

Further, when there are a plurality of types of deformation patterns as the deformation pattern, the shape of the design target element after deformation changes depending on the order in which a plurality of types of deformation patterns are applied. Therefore, by changing the application order of a plurality of types of deformation patterns and applying them to the design target element (namely, changing the order of a plurality of types of the deformation patterns $310a$, $310b$ used when changing the shape of the design target element), it becomes possible to search for the shape of the design target element that improves the characteristic of the device (IPMSM in this embodiment) within the range assumed as the core, from within a search region in a wide range. In this case, the content of the deformation indicated in the deformation pattern is made the content of the deformation in which the shapes before and after change are brought into a homeomorphic mapping relationship. Therefore, it becomes possible to search for the shape of the design target element that improves the characteristic of the device (IPMSM in this embodiment) within the range assumed as the core from within a search region in a wide range, while preserving the homeomorphic property of the design target elements before and after deformation.

Then, by combining the repeated application of the deformation pattern to the design target element and the application of a plurality of types of deformation patterns to the design target element by changing their application order, the shape of the design target element that improves the characteristic of the device (IPMSM in this embodiment) can be searched for from within a search region in a wider range. In this case, the content of the deformation indicated in the deformation pattern is made the content of the deformation in which the shapes before and after change are brought into a homeomorphic mapping relationship. Therefore, while preserving the homeomorphic property of the design target elements before and after deformation, the shape of the design target element that improves the characteristic of the device (IPMSM in this embodiment) can be searched for from within a search region in a wider range.

When applying the deformation pattern to the design target element as described above, it is preferable that the amount of change in the shape of the design target element due to one-time application of the deformation pattern is small. This is because the design target element can be gradually deformed, allowing the search for a shape of the design target element that further improves the characteristic of the device. In the following explanation, there is explained, as an example, the case where the content of the deformation indicated in the deformation pattern is the content of the deformation in which the shapes before and after change are brought into a homeomorphic mapping relationship.

Figure 3A:
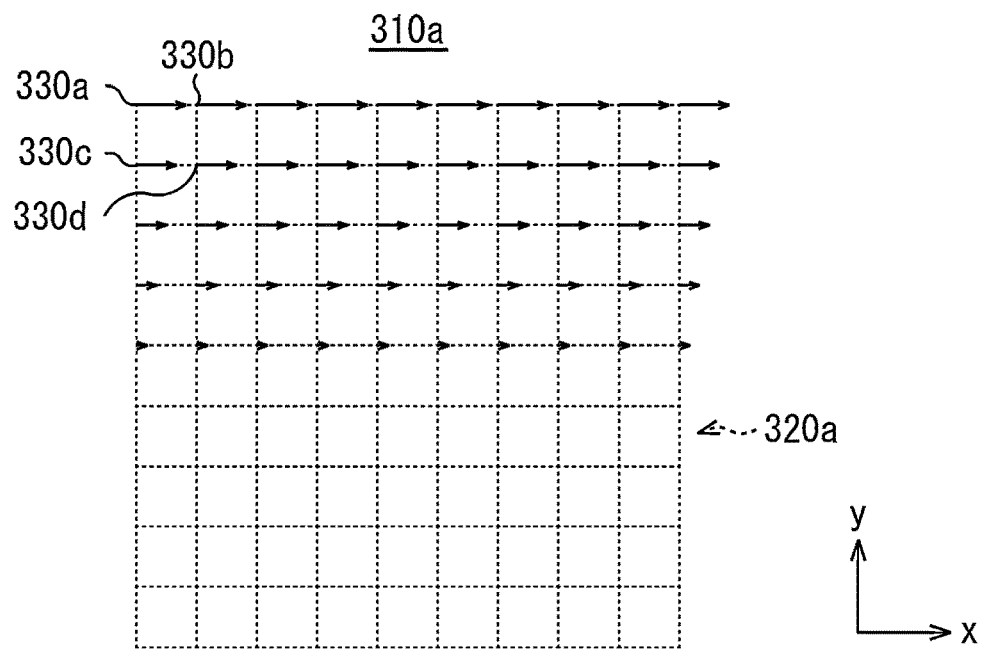
FIG. 3A is a view conceptually illustrating a first example of a deformation pattern.
Figure 3B:
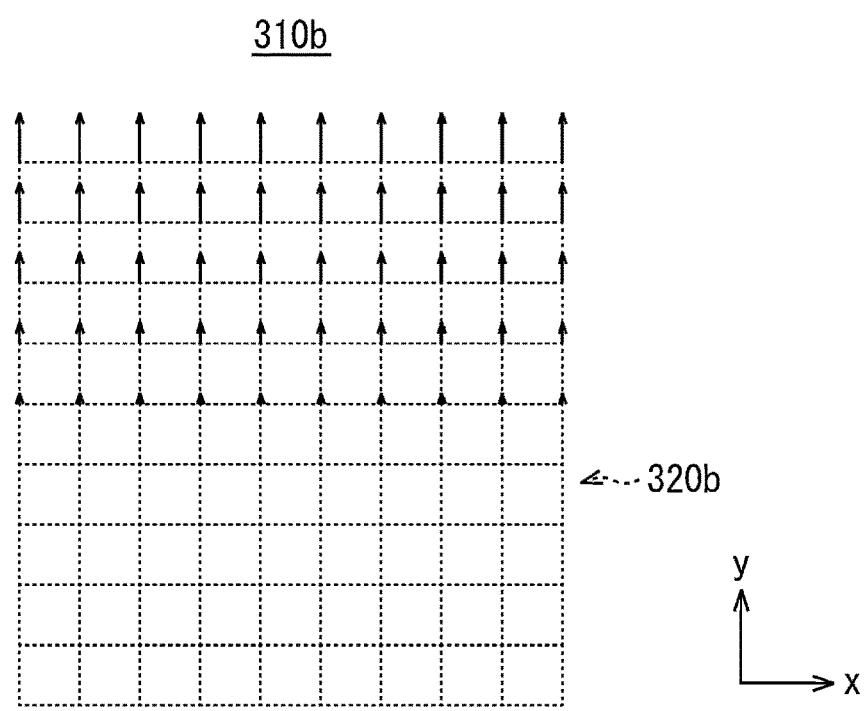
FIG. 3B is a view conceptually illustrating a second example of the deformation pattern.

FIG. 3A and FIG. 3B are views conceptually illustrating one example of the deformation patterns 310a, 310b. FIG. 3A is a view illustrating a first example of the deformation pattern 310a. FIG. 3B is a view illustrating a second example of the deformation pattern 310b. FIG. 4A and FIG. 4B are views conceptually illustrating one example of how the design target elements 230a, 230b with the basic shape are deformed by applying the deformation patterns 310a, 310b to the design target elements 230a, 230b with the basic shape. Specifically, FIG. 4A is a view conceptually illustrating one example of how the design target element 230 with the basic shape is deformed into a region 240a of the design target element by applying the deformation pattern 310a illustrated in FIG. 3A to the design target element 230 with the basic shape. Further, FIG. 4B is a view conceptually illustrating one example of how the design target element 230 with the basic shape is deformed into a region 240b of the design target element by applying the deformation pattern 310b illustrated in FIG. 3B to the design target element 230 with the basic shape. In the following explanation, the regions 240a, 240b of the design target elements are referred to as design target elements 240a, 240b after change due to the deformation patterns 310a, 310b, or simply as design target elements 240a, 240b after change as necessary.

In FIG. 3A and FIG. 3B, grid regions indicated by dotted lines are the regions of the deformation patterns 310a, 310b that are applied to the design target element. In the following explanation, these regions are referred to as deformation pattern application regions 320a, 320b as necessary. The arrow line extending from the position of the grid indicated by the dotted line represents a displacement vector that indicates the content of displacement of a portion of the design target element that overlaps the position. The length of the arrow line represents the magnitude of the displacement vector. Further, the direction of the arrow line represents the direction of the displacement vector. Each displacement vector can be set to have any magnitude (length) and direction (angle) within a range that does not impair the homeomorphic property. Therefore, shape displacement that cannot be expressed by matrix operations can be expressed as the change in the shape of the design target element. Therefore, a shape change with a high degree of freedom can be expressed as the change in the shape of the design target element. The displacement indicated by each displacement vector is displacement at each position in the relative coordinate system on the basic shape of the design target element. The relative coordinates on the basic shape of the design target element are coordinates in a case where a predetermined position (coordinates) of the outer edge of the design target element with the basic shape is set to a reference. In the examples illustrated in FIG. 4A and FIG. 4B, the displacement in the relative coordinate system on the basic shape of the design target element is the displacement in a case where the position that coincides with the grid indicated by the dotted line of the position of the outer edge of the design target element 230 with the basic shape is set to a reference. As above, in this embodiment, there is explained, as an example, the case where the deformation patterns 310a, 310b indicate displacement vectors at each position in the relative coordinate system on the basic shape of the design target element. However, the deformation patterns 310a, 310b do not have to indicate the displacement vector itself, as long as they indicate the displacement at each position in the relative coordinate system on the basic shape of the design target element. For example, they may include information that can specify the displacement vector (for example, displacement at each axis of the relative coordinate system).

In FIG. 3A and FIG. 3B, for convenience of notation, the displacement vectors are illustrated only at the positions of the grids indicated by dotted lines. However, such displacement vectors are set at all the coordinates of the deformation pattern application regions 320a, 320b. For example, by performing interpolation using the displacement vectors set at four vertices (for example, vertices 330a to 330d in FIG. 3A) of one grid indicated by dotted lines, the displacement vector of each coordinate in the region of the grid may be calculated. The interpolation is performed, for example, by calculating a weighted average value of the displacement vectors set at the four vertices. For example, as the displacement vector of a certain coordinate within a certain grid, the weighted average value of the displacement vectors at the four vertices of the grid is calculated. Weights (namely, weights for the displacement vectors at the four vertices of the grid) used in calculating the weighted average value are set to have a larger value as the distance from the vertex to the coordinate is shorter. Incidentally, the interpolation method itself can be implemented by a well-known method, and is not limited to the previously-described method.

As above, in this embodiment, there is explained, as an example, the case where pieces of information indicating the displacement vectors at respective coordinates of the deformation pattern application regions 320a, 320b are included in the deformation patterns 310a, 310b.

As illustrated in the left-side views in FIG. 4A and FIG. 4B, in this embodiment, there is explained, as an example, the case where the deformation patterns 310a, 310b are applied to the design target element 230 with the basic shape by setting the deformation pattern application regions 320a, 320b on the design target element 230 with the basic shape so that a position 0 of the center of gravity of the design target element 230 with the basic shape and positions 0 of the center of gravity of the deformation pattern application regions 320a, 320b of the deformation patterns 310a, 310b match.

When the deformation pattern application regions 320a, 320b are set on the design target element 230 with the basic shape as above, the coordinates of the outer edge of the design target element 230 with the basic shape are changed according to the displacement vectors set at the coordinates of the deformation pattern application regions 320a, 320b that match the coordinates of the outer edge of the design target element 230 with the basic shape, and thereby the coordinates of the outer edge of the design target element 230 with the basic shape are changed. Such change in the coordinates of the outer edge of the design target element 230 with the basic shape is performed for each of the coordinates of the outer edge. Therefore, the sizes of the deformation pattern application regions 320a, 320b are preferably larger than the size assumed as the size of the design target element 230 with the basic shape. This is because it is possible to change all the coordinates of the outer edge of the design target element 230 with the basic shape.

In the example illustrated in FIG. 4A, by applying the deformation pattern 310a illustrated in FIG. 3A to the design target element 230 with the basic shape, the design target element 230 with the basic shape becomes the design target element 240a after change due to the deformation pattern 310a. In this case, the shapes of the design target elements before and after deformation (design target element 240a after deformation due to the design target element 230 with the basic shape and the deformation pattern 310a) have a homeomorphic mapping relationship as well as a nonlinear mapping relationship. Similarly, as illustrated in FIG. 4B, by applying the deformation pattern 310b illustrated in FIG. 3B to the design target elements 230a, 230b with the basic shape, the design target element 230 with the basic shape becomes the design target element 240b after change due to the deformation pattern 310b. In this case, the shapes of the design target elements before and after deformation (design target element 240b after deformation due to the design target element 230 with the basic shape and the deformation pattern 310b) have a homeomorphic mapping relationship as well as a nonlinear mapping relationship.

As illustrated in FIG. 4A, the deformation pattern 310a illustrated in FIG. 3A is a deformation pattern intended to greatly deform the region of the design target element with the basic shape on the positive-direction side of the y axis more toward the positive-direction side of the x axis as the coordinates are on the positive-direction side of the y axis. By using the deformation patterns 310a, 310b as above, nonlinear mapping that greatly bends the design target element with the basic shape can be implemented in a single operation (mapping).

Further, in the example illustrated in FIG. 4B, the deformation pattern 310b illustrated in FIG. 3B is a deformation pattern intended to greatly change the region of the design target element with the basic shape on the positive-direction side of the y axis more toward the positive-direction side of the y axis as the coordinates are on the center side of the x axis. The deformation pattern may be, for example, a deformation pattern in which the direction of the displacement vector set in the deformation pattern application region 320b of the deformation pattern 310b illustrated in FIG. 4B is reversed (to the negative-direction side (lower side) of the y axis). In this case, the design target element 230 with the basic shape is changed to a shape in which a partial region of the design target element 230 with the basic shape shrinks (is depressed).

As above, by using the deformation patterns 310a, 310b, nonlinear mapping that expands or shrinks a partial region of the design target element can be implemented in a single operation (mapping). Further, the nonlinear mapping that expands or shrinks a partial region of the design target element can be homeomorphic mapping.

Incidentally, in FIG. 4A and FIG. 4B, to make the deformation understandable, the design target elements 240a, 240b after deformation due to the deformation patterns 310a, 310b are illustrated in an exaggerated manner. That is, the design target elements 240a, 240b after deformation due to the deformation patterns 310a, 310b are not made to exactly match the displacement vectors illustrated in the deformation patterns 310a, 310b.

As described above, the content of the deformations due to the deformation patterns 310a, 310b (pieces of information indicating the content of the deformations included in the deformation patterns 310a, 310b) are predetermined so that such basic deformations as explained with reference to FIG. 3A and FIG. 3B are performed on part or all of the outer edge of the region of the design target element (flux barriers 230a, 230b in this embodiment). In this embodiment, the content of the deformations due to the deformation patterns 310a, 310b are determined by the size of the deformation pattern application regions 320a, 320b and the displacement vector at each coordinate of the deformation pattern application regions 320a, 320b. What kind of deformation is to be considered as the basic deformation is predetermined according to the type of design target element or other factors.

Incidentally, in FIG. 3A and FIG. 3B, there is explained, as an example, the case where there are vertices that are not marked with arrow lines as the vertices of grids illustrated by dotted lines. The case indicates that no displacement vector has been set at the vertex not marked with an arrow line (in other words, a displacement vector with a magnitude of 0 (zero) is set at the vertex). As above, it is not necessary to set the displacement vectors at all the coordinates of the deformation pattern application regions 320a, 320b. However, the displacement vectors may be set at all the coordinates of the deformation pattern application regions 320a, 320b.

Further, in FIG. 3A and FIG. 3B, there is explained, as an example, the case where displacement vectors in the same direction are set at all the coordinates of the deformation pattern application regions 320a, 320b. This corresponds to changing the coordinates in the same direction (positive direction of the x axis in FIG. 3A and positive direction of the y axis in FIG. 3B). However, this embodiment does not necessarily have to be set in this manner. For example, displacement vectors in mutually different directions may be set in the (single) deformation pattern application region 320a, 320b. However, it is preferable that the content of the deformation due to the displacement vector is determined so that the shapes of the design target elements before and after deformation are brought into a homeomorphic mapping relationship in one deformation using the deformation patterns 310a, 310b.

In this embodiment, there is explained, as an example, the case where the deformation pattern acquisition part 131 acquires and stores information on a plurality of types of the deformation patterns 310a, 310b described above. However, the information on the deformation patterns 310a, 310b acquired by the deformation pattern acquisition part 131 may be only one type. The information on the deformation patterns 310a, 310b is information necessary for uniquely specifying the content of the deformation due to the deformation patterns 310a, 310b. In this embodiment, there is explained, as an example, the case where the information on the deformation patterns 310a, 310b includes the information indicating the displacement vector at each coordinate of the deformation pattern application regions 320a, 320b. Incidentally, if at least part of the content of the deformations indicated in a plurality of the deformation patterns 310a, 310b differs, a plurality of the deformation patterns 310a, 310b result in deformation patterns 310a, 310b different in type from each other. In this embodiment, if at least one of the magnitude and the direction of the displacement vector differs at at least one coordinate of the deformation pattern application regions 320a, 320b, a plurality of the deformation patterns 310a, 310b result in deformation patterns 310a, 310b different in type. Incidentally, the deformation patterns do not have to be plural types (that is, the deformation patterns may be one type).

Further, what kind of deformation should be performed as the basic deformation with the deformation patterns 310a, 310b differs depending on the type of design target element or other factors. Further, for example, by repeatedly performing design of the core by the core design apparatus 100, a preferred deformation as the basic deformation due to the deformation patterns 310a, 310b may be found out later. Therefore, after acquiring the deformation patterns 310a, 310b, the deformation pattern acquisition part 131 may newly acquire the deformation patterns 310a, 310b (that is, the deformation patterns 310a, 310b may be updated as appropriate).

In this embodiment, there is explained, as an example, the case where the designer inputs the information on the deformation patterns 310a, 310b to the core design apparatus 100 by operating the user interface of the core design apparatus 100. In this case, the deformation pattern acquisition part 131 acquires the information on the deformation patterns 310a, 310b input to the core design apparatus 100 via the user interface of the core design apparatus 100, for example. However, the method by which the deformation pattern acquisition part 131 acquires the information on the deformation patterns 310a, 310b is not limited to this method. For example, an external device may transmit the information on the deformation patterns 310a, 310b to the core design apparatus 100, and the deformation pattern acquisition part 131 may acquire the information on the deformation patterns 310a, 310b by receiving it via the communication interface.

<<Parameter Acquisition Part 132>>

The parameter acquisition part 132 acquires an application parameter. The application parameter includes a parameter indicating an application method of the deformation patterns 310a, 310b when applying the deformation patterns 310a, 310b to the design target element. As will be described later, in this embodiment, there is explained, as an example, the case where the design target element change part 133 applies the deformation patterns 310a, 310b to the design target element to change the shape of the design target element according to the application method of the deformation patterns 310a, 310b included in the application parameter acquired by the parameter acquisition part 132.

As described previously, by combining the repeated application of the deformation patterns 310a, 310b to the design target element and the application of a plurality of types of the deformation patterns 310a, 310b to the design target element while changing their application order, the shape of the design target element is changed. Therefore, it becomes possible to search for the shape of the design target element that improves the characteristic of the device (IPMSM in this embodiment) from within a search region in a wider range, while preserving the homeomorphic property of the design target elements before and after deformation. Thus, in this embodiment, there is explained, as an example, the case where the application method of the deformation patterns 310a, 310b includes the types of the deformation patterns 310a, 310b to be applied to the design target element, the number of times the deformation patterns 310a, 310b are repeatedly applied to the design target element, and the application order of a plurality of types of the deformation patterns 310a, 310b when there are a plurality of types of the deformation patterns 310a, 310b to be applied to the design target element.

Incidentally, in the following explanation, the types of the deformation patterns 310a, 310b to be applied to the design target element are referred to as types of the deformation patterns 310a, 310b, or simply types, as necessary. Further, the number of times the deformation patterns 310a, 310b are repeatedly applied to the design target element is referred to as the number of times of application of the deformation patterns 310a, 310b, or simply the number of times of application, as necessary. Further, the application order of a plurality of types of the deformation patterns 310a, 310b to be applied to the design target element is referred to as the application order of the deformation patterns 310a, 310b, or simply the application order, as necessary. Further, the application method of the deformation patterns 310a, 310b is not limited to the type, the number of times of application, or the application order of the deformation patterns 310a, 310b. For example, only one of the number of times of application and the application order of the deformation patterns 310a, 310b may be included in the application method of the deformation patterns 310a, 310b. Further, for example, repeatedly applying each of a plurality of types of the deformation patterns 310a, 310b once may be included in the application method of the deformation patterns 310a, 310b.

Further, in this embodiment, there is explained, as an example, the case where the application parameter including the type, the number of times of application, and the application order of the deformation patterns 310a, 310b is set as an optimization parameter. Further, in this embodiment, there is explained, as an example, the case where the core shape determination part 130 calculates an optimal solution of the optimization parameter using an optimization problem algorithm. More specifically, in this embodiment, there is explained, as an example, the case where a genetic algorithm, which is one of the metaheuristic methods, is used as the optimization problem algorithm. As above, in this embodiment, there is explained, as an example, the case where the application parameter is a variable parameter, and the deformation patterns 310a, 310b are fixed parameters. Incidentally, the variable parameter means that the content can be changed in the process of determining the shape of the core. The fixed parameter means that the content is not changed in the process of determining the shape of the core. Specifically, in this embodiment, there is explained, as an example, the case where the application parameter is changed in the process of searching for the optimal solution of the optimization parameter. On the other hand, in this embodiment, there is explained, as an example, the case where the deformation patterns 310a, 310b is not changed in the process of searching for the optimal solution of the optimization parameter.

Further, in this embodiment, there is explained, as an example, the case where in addition to the application parameter, a parameter used for applying linear mapping (affine transformation) is also included in the optimization parameter. In the following explanation, the parameter used for applying the linear mapping (affine transformation) is referred to as a linear mapping parameter as necessary. As above, if the linear mapping is applied to the design target element in addition to the deformation due to the deformation patterns, the time required to search for the optimal solution of the optimization parameter (the type, the number of times of application, and the application order of the deformation patterns 310a, 310b) can be reduced. Therefore, if the calculation time is the same between the case where the linear mapping parameter is included in the optimization parameter and the case where the linear mapping parameter is not included in the optimization parameter, the former case enables the search for the optimal solution from a search region in a wider range than the latter case.

As above, in this embodiment, there is explained, as an example, the case where the type, the number of times of application, and the application order of the deformation patterns 310a, 310b, and the linear mapping parameter is included in the optimization parameter (application parameter). Further, in this embodiment, there is explained, as an example, the case where the core shape determination part 130 calculates the optimal solutions of the optimization parameter using the genetic algorithm.

In this embodiment, the parameter acquisition part 132 calculates a candidate solution of the optimization parameter. One candidate solution of the optimization parameter includes the type, the number of times of application, and the application order of the deformation patterns 310a, 310b, and the linear mapping parameter. In this embodiment, the parameter acquisition part 132 calculates a plurality of candidate solutions as such a candidate solution of the optimization parameter. Incidentally, the number of candidate solutions of the optimization parameter acquired by the parameter acquisition part 132 may be one. Further, initial values of the candidate solutions of the optimization parameters are set, for example, by a well-known method performed in the genetic algorithm. The initial values of the candidate solutions of the optimization parameter are set randomly using, for example, random numbers. Further, the type of the deformation patterns 310a, 310b included in the optimization parameter is selected from the deformation patterns 310a, 310b that have been acquired by the deformation pattern acquisition part 131 (see FIG. 3A and FIG. 3B). Further, upper limit values may be set for the number of types and the number of times of application of the deformation patterns 310a, 310b included in the optimization parameter. Further, when calculating candidate solutions of the optimization parameter for the second and subsequent times, the parameter acquisition part 132 updates the already calculated candidate solutions of the optimization parameter according to the genetic algorithm.

Here, there is explained one example of the linear mapping parameter.

The xy coordinates of the outer edge of the region of the design target element before mapping is applied (for example, the design target elements 230a, 230b with the basic shape) are set to (x, y). Then, the xy coordinates (x', y') of the outer edge of the region of the design target element after mapping is applied are expressed by (1) Equation below.

[Mathematical equation 1]

$$\begin{pmatrix} x' \\ y' \end{pmatrix} = \begin{pmatrix} a & b \\ c & d \end{pmatrix} \begin{pmatrix} x \\ y \end{pmatrix} + \begin{pmatrix} e \\ f \end{pmatrix} \quad (1)$$

When the mapping is linear mapping, components a, b, c, d, e, and f of the matrix in (1) Equation are real numbers (numeric values). When the mapping is linear mapping, the mapping can be found by finding these components a to f. Therefore, the linear mapping parameter includes the values of the components a to f. In other words, one of the combinations of the values of the components a to f is the linear mapping parameter. Incidentally, the linear mapping itself is implemented as described in Patent Literature 1. Therefore, a detailed explanation of the linear mapping is omitted here.

<<Design Target Element Change Part 133>>

The design target element change part 133 changes the shape of the design target element using the deformation patterns 310a, 310b and the application parameter. In this embodiment, the design target element change part 133 applies the nonlinear mapping to the design target element by applying the deformation patterns 310a, 310b to the design target element according to the application method of the deformation patterns 310a, 310b included in the application parameter acquired by the parameter acquisition part 132.

As described previously, in this embodiment, there is explained, as an example, the case where the application method of the deformation patterns 310a, 310b and the linear mapping parameter are included in the application parameter (optimization parameter). Therefore, in this embodiment, the design target element change part 133 performs application of the deformation patterns 310a, 310b to the design target element according to the application method of the deformation patterns 310a, 310b to change the shape of the design target element, and application of the linear mapping to the design target element. Here, when the linear mapping is applied to the design target element and then the shape of the design target element is changed with the content indicated in the deformation patterns 310a, 310b, the design target element to which the linear mapping has been applied may become larger than the deformation pattern application regions 320a, 320b. Thus, in this embodiment, there is explained, as an example, the case where the design target element change part 133 changes the shape of the design target element by applying the deformation patterns 310a, 310b to the design target element according to the application method of the deformation patterns 310a, 310b, and then further changes the shape of the design target element by applying the linear mapping to the design target element. However, for example, when the deformation pattern application regions 320a, 320b are sufficiently large, the design target element change part 133 may change the shape of the design target element by applying the linear mapping to the design target element, and then further change the shape of the design target element by applying the deformation patterns 310a, 310b to the design target element according to the application method of the deformation patterns 310a, 310b.

Further, as described previously, in this embodiment, there is explained, as an example, the case where the genetic algorithm, which is one of the metaheuristic methods, is used as the optimization problem algorithm. Thus, the design target element change part 133 selects one candidate solution of the optimization parameter for one design target element from among a plurality of the candidate solutions of the optimization parameter calculated by the parameter acquisition part 132. When the number of design target elements is one, the design target element change part 133 selects one candidate solution from among a plurality of the candidate solutions of the optimization parameter calculated by the parameter acquisition part 132. When the number of design target elements is plural, the design target element change part 133 selects candidate solutions of the optimization parameters as many as the number of design target elements from among a plurality of the candidate solutions of the optimization parameters calculated by the parameter acquisition part 132, and sets one candidate solution of the optimization parameter for one design target element.

Then, the design target element change part 133 changes the shape of the design target element by applying the deformation patterns 310a, 310b to the design target element according to the type, the number of times of application, and the application order of the deformation patterns 310a, 310*b* that are included in the candidate solution of the optimization parameter selected in the above manner.

For example, it is set that information indicating that the type of the deformation patterns 310*a*, 310*b* indicates the deformation patterns 310*a*, 310*b* illustrated in FIG. 3A and FIG. 3B, the number of times the deformation patterns 310*a*, 310*b* are applied is five times for the deformation pattern 310*a* and two times for the deformation pattern 310*b*, and the application order of the deformation patterns 310*a*, 310*b* is the order of the deformation patterns 310*a*, 310*b* is included in the candidate solution of the optimization parameter. Further, it is set that such a candidate solution of the optimization parameter is set for the design target element 230*a* with the basic shape illustrated in FIG. 2B.

In this case, the design target element change part 133 changes the shape of the design target element 230*a* with the basic shape by repeatedly applying the deformation pattern 310*a* to the design target element 230*a* with the basic shape five times and then repeatedly applying the deformation pattern 310*b* to the design target element 230*a* with the basic shape two times. Incidentally, the method of changing the shape of the design target element with the deformation patterns 310*a*, 310*b* is as described previously with reference to FIG. 3A and FIG. 3B and FIG. 4A and FIG. 4B.

Figure 5A:
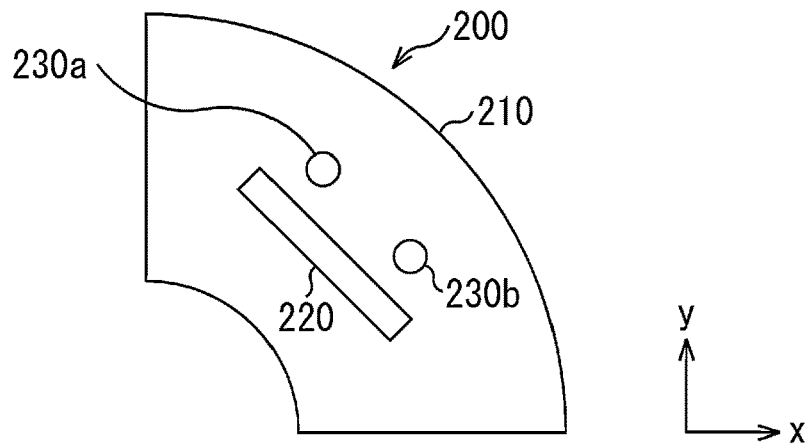
FIG. 5A is a view conceptually illustrating one example of a first stage of the process of the design of the core when the shape of the design target element is changed.
Figure 5B:
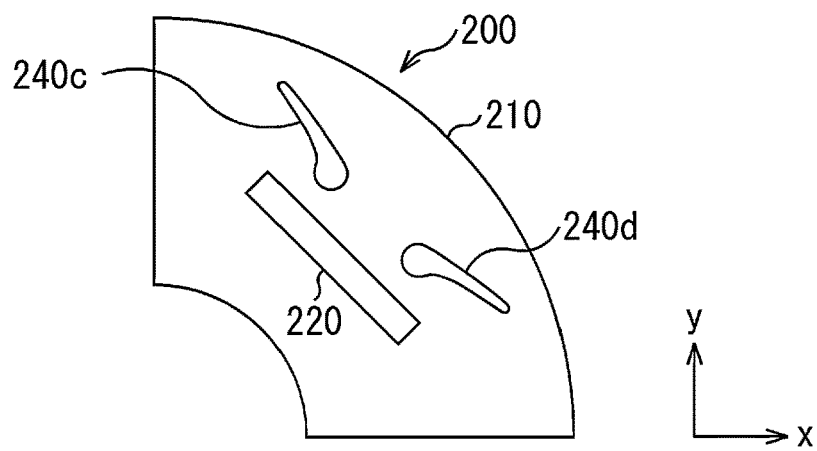
FIG. 5B is a view conceptually illustrating one example of a second stage of the process of the design of the core when the shape of the design target element is changed.
Figure 5C:
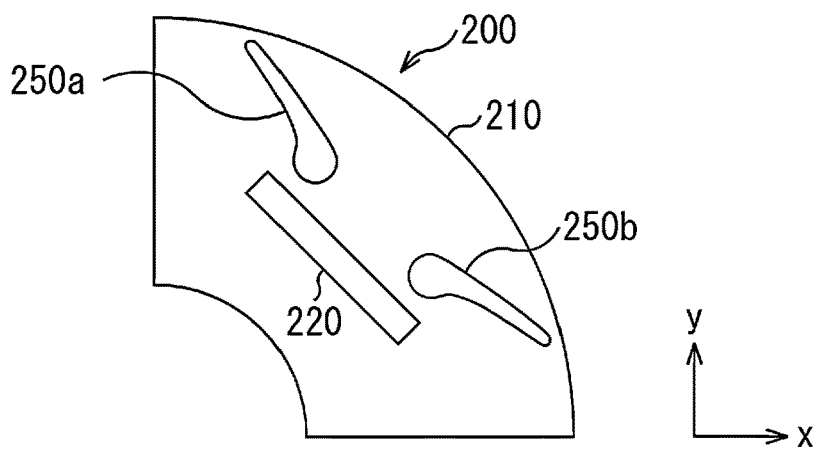
FIG. 5C is a view conceptually illustrating one example of a third stage of the process of the design of the core when the shape of the design target element is changed.

FIG. 5A to FIG. 5C are views conceptually illustrating one example of the process of the design of the core when the shape of the design target element is changed. FIG. 5A is a view illustrating one example of the element of the core where the design target elements 230*a*, 230*b* with the basic shape are set, which is the same as FIG. 3B. FIG. 5B is a view illustrating one example of the element of the core where the deformation patterns 310*a*, 310*b* are applied to the design target elements 230*a*, 230*b* with the basic shape, and thereby the design target elements 230*a*, 230*b* with the basic shape are changed to the design target elements 240*a*, 240*b* after change. FIG. 5C is a view illustrating one example of the element of the core where linear mapping is applied to the design target elements 240*a*, 240*b* after change due to the deformation patterns 310*a*, 310*b*, and thereby the shape is further changed.

The design target element change part 133 changes, for example, the design target elements 230*a*, 230*b* with the basic shape illustrated in FIG. 5A to design target elements 240*c*, 240*d* after change illustrated in FIG. 5B.

As illustrated in FIG. 5B, the design target elements 240*c*, 240*d* after change due to the deformation patterns 310*a*, 310*b* are changed not only in shape but also in size with respect to the design target elements 230*a*, 230*b* with the basic shape. Incidentally, when displacement vectors (with a magnitude greater than zero) are set at all the coordinates of the deformation pattern application regions 320*a*, 320*b*, all the positions of the outer edges of the design target elements 240*c*, 240*d* after change due to the deformation patterns 310*a*, 310*b* are changed from the positions of the regions 230*a*, 230*b* of the design target elements before change.

Further, for convenience of explanation and notation, the relationship between the design target elements 230*a*, 230*b* with the basic shape illustrated in FIG. 5A and the design target elements 240*c*, 240*d* after change illustrated in FIG. 5B does not correspond to the specific example described previously (where the deformation pattern 310*a* is repeatedly applied to the design target element 230*a* with the basic shape five times, and then the deformation pattern 310*b* is repeatedly applied thereto two times).

When the number of design target elements is plural, the design source information acquisition part 133 performs such change in the shape of the design target element as above for each of a plurality of the design target elements according to the optimization parameter (the type, the number of times of application, and the application order of the deformation patterns 310*a*, 310*b*) set for the design target element.

Then, when the identification information set for each coordinate of the design target elements 240*c*, 240*d* after deformation due to the deformation patterns 310*a*, 310*b* is ID1, the design target element change part 133 changes the identification information ID1 to the identification information ID3 intended for identifying the region of the design target element from other regions. When compared to the design target elements 230*a*, 230*b* with the basic shape illustrated in FIG. 5A, partial regions of the design target elements 240*c*, 240*d* after change illustrated in FIG. 5B are included in the iron core 210 before the deformation is made. Therefore, the identification information set for each coordinate of this region is changed from ID1 to ID3.

Further, the design target element change part 133 changes the identification information set for the coordinates of the region that does not overlap the design target elements 240*c*, 240*d* after deformation due to the deformation patterns 310*a*, 310*b* out of the regions of the design target elements before deformation due to the deformation patterns 310*a*, 310*b* (design target elements 230*a*, 230*b* with the basic shape in the examples illustrated in FIG. 5A to FIG. 5C) from ID3 to ID1. In the examples illustrated in FIG. 5A and FIG. 5B, there is no region for changing the identification information from ID3 to ID1. However, for example, when the design target element 230*a* with the basic shape illustrated in FIG. 5A has a region that does not overlap the design target element 240*c* after deformation illustrated in FIG. 5B, the identification information set for each coordinate of the region is changed from ID3 to ID1.

Then, the design target element change part 133 applies the linear mapping to the design target elements 240*c*, 240*d* after change due to the deformation patterns 310*a*, 310*b* calculated from the design target element based on the linear mapping parameter included in the candidate solution of the optimization parameter set for the design target element.

As described previously, the values of the components a to f illustrated in (1) Equation are included in the linear mapping parameter. The design target element change part 133 gives the linear mapping parameter (values of the components a to f) included in the candidate solution of the optimization parameter to (1) Equation.

Then, the design target element change part 133 gives the coordinates (x, y) of the outer edges of the design target elements 240*c*, 240*d* after deformation due to the deformation patterns 310*a*, 310*b* to (1) Equation, to thereby perform calculation of the coordinates (x', y') of the outer edges of the regions of the design target elements to which the linear mapping has been applied for all the coordinates (x, y) of the outer edges of the design target elements 240*c*, 240*d* after change.

When the number of design target elements is plural, the design target element change part 133 performs giving the linear mapping parameter (values of the components a to f) included in the optimization parameter set for the design target element to (1) Equation to thereby change the shape of the design target element for each of a plurality of the design target elements.

The design target element change part 133 changes the design target elements 240*c*, 240*d* after deformation illustrated in FIG. 5B, for example, to regions 250*a*, 250*c* of the design target elements illustrated in FIG. 5C. In the following explanation, the regions 250*a*, 250*b* of the design target elements are referred to as design target elements 250a, 250b after linear mapping as necessary.

As illustrated in FIG. 5C, the design target elements 250a, 250b after linear mapping are changed not only in shape but also in size with respect to the design target elements 240c, 240d after change due to the deformation patterns 310a, 310b. Incidentally, when a value other than 0 (zero) is set as the value of the component e or f, all the positions of the outer edges of the design target elements 250a, 250b after linear mapping are changed from the design target elements 240c, 240d after change due to the deformation patterns 310a, 310b.

When the number of design target elements is plural, the design target element change part 133 gives the linear mapping parameter (values of the components a to f) included in the optimization parameter set for the design target element to (1) Equation, to thereby apply the above linear mapping to each of a plurality of the design target elements.

Then, when the identification information set for each coordinate of the design target elements 250a, 250b after linear mapping is ID1, the design target element change part 133 changes the identification information ID1 to the identification information ID3 intended for identifying the region of the design target element from other regions. When compared to the design target elements 240c, 240d after change due to the deformation patterns 310a, 310b illustrated in FIG. 5B, partial regions of the design target elements 250a, 250b after linear mapping illustrated in FIG. 5C are included in the iron core 210 before the deformation is made. Therefore, the identification information set for each coordinate of this region is changed from ID1 to ID3.

Further, the design target element change part 133 changes the identification information set for the coordinates of the region that does not overlap the design target elements 250a, 250b after linear mapping out of the design target elements 240c, 240d after deformation due to the deformation patterns 310a, 310b from ID3 to ID1. In the examples illustrated in FIG. 5B and FIG. 5C, there is no region for changing the identification information from ID3 to ID1. However, for example, when the design target element 240c after deformation due to the deformation patterns 310a, 310b illustrated in FIG. 5B has a region that does not overlap the design target element 250a after linear mapping illustrated in FIG. 5C, the identification information set for each coordinate of the region is changed from ID3 to ID1.

Then, when there is a design target element where overlap•protrusion occurs at the design target elements 250a, 250b after linear mapping calculated as above, the design target element change part 133 changes the design target element again so that the overlap•protrusion at the design target element is eliminated. Here, the overlap•protrusion indicates at least one of overlap and protrusion. The overlap means that at least a partial region of the design target element overlaps a predetermined element of the core. The predetermined element of the core includes the design target element. Further, the predetermined element of the core may include elements other than the design target element (permanent magnet 220 in the example of this embodiment). The reason for eliminating the overlap is because, for example, if the overlap is not eliminated, a plurality of pieces of identification information are set in the overlapping part, so that the identification information for the part cannot be uniquely determined. The protrusion means that a partial region of the design target element protrudes from the design region 200 (iron core 210). The reason for eliminating the protrusion is, for example, to prevent a partial region of the design target element from existing outside the design region 200, which is the range of design of the design target element. Further, for example, as illustrated in FIG. 2A and FIG. 2B, when one region of the four regions obtained by dividing the cross section cut perpendicular to the center line of the IPMSM into four equal parts is set as the design region 200, if the protruding part is left as it is, the design target element to be determined finally is to extend to the regions other than this one region (design region 200). This is also the reason for eliminating the protrusion. Incidentally, as described previously, in this embodiment, there is explained, as an example, the case where linear mapping is applied to the design target elements 240a, 240b after change due to the deformation patterns 310a, 310b, and thereby the shapes of the design target elements 240a, 240b after change are further changed to the design target elements 250a, 250b after linear mapping. Therefore, in this embodiment, there is explained, as an example, the case where the design target element change part 133 determines whether or not there is a design target element where overlap•protrusion has occurred at the design target elements 250a, 250b after linear mapping. However, when the linear mapping is not applied to the design target element, for example, the design target element change part 133 determines whether or not there is a design target element where overlap•protrusion has occurred at the design target elements 240c, 240d after change due to the deformation patterns 310a, 310b.

FIG. 6A to FIG. 6D are views each explaining one example of the overlap.

FIG. 6A is a view conceptually illustrating one example of overlap between design target elements of the same type.

As illustrated in the left-side view of FIG. 6A, when partial regions of the design target elements 250c, 250d after linear mapping of the same type overlap each other, as illustrated in the right-side view of FIG. 6A, the design target element change part 133 sets one region surrounded by the outer edges of the design target elements 250c, 250d after linear mapping to one design target element 250e after linear mapping. In this case, the design target elements 250c, 250d after linear mapping are changed to a single design target element.

FIG. 6B is a view conceptually illustrating one example of overlap between design target elements different in type.

As illustrated in the left-side view of FIG. 6B, when partial regions of design target elements 250f, 250g after linear mapping different from each other in type overlap each other, as illustrated in the right-side view of FIG. 6B, the design target element change part 133 sets the regions overlapping each other to the design target element 250f after linear mapping with the highest priority order. Further, as illustrated in the right-side view of FIG. 6B, the design target element change part 133 sets the region obtained by removing the regions overlapping each other from the design target element 250g after linear mapping with a low priority order to a new design target element 250h after linear mapping. The design target element change part 133 sets only the identification information ID3 intended for identifying the design target element 250f after linear mapping with the highest priority order from other elements (regions) for each coordinate of the regions overlapping each other, and deletes the other identification information ID3.

For example, when the permanent magnet is also set to the design target element in addition to the flux barrier, pieces of the separate identification information ID3 are set for the flux barrier and the permanent magnet. When the priority order of the permanent magnet is made higher than that of the flux barrier, in the example illustrated in FIG. 6B, the region of the flux barrier becomes the design target element 250*h* after linear mapping, and the region of the permanent magnet becomes the design target element 250*f* after linear mapping. Therefore, the identification information ID3 intended for identifying the permanent magnet from other elements (regions) is set for the coordinates of the region where the design target elements 250*g*, 250*f* after linear mapping overlap each other, and the identification information ID3 intended for identifying the flux barrier from other elements (regions) is deleted. Incidentally, the priority order is set in advance based on design guidelines of the core, attributes of design target elements, or the like.

FIG. 6C is a view conceptually illustrating a first example of overlap between the design target element after linear mapping and a predetermined element of the core other than the design target element. The predetermined element of the core other than the design target element is an element whose shape is not changed, and is set in advance. Here, it is set that the shape of the iron core can be changed, but the shape of the permanent magnet is not changed.

As illustrated in FIG. 6C, when a partial region of a design target element 250*i* after linear mapping overlaps a partial region of a predetermined element of the core other than the design target element (permanent magnet 220) without crossing the predetermined element of the core other than the design target element (permanent magnet 220), as illustrated in the right-side view of FIG. 6C, the design target element change part 133 sets the region obtained by removing the region overlapping the predetermined element of the core other than the design target element (permanent magnet 220) from the design target element 250*i* after linear mapping to a new design target element 250*j* after linear mapping. Further, the design target element change part 133 deletes the identification information ID3 intended for identifying the design target element from other elements (regions), which is set for each coordinate of the region overlapping the predetermined element of the core other than the design target element (permanent magnet 220).

FIG. 6D is a view conceptually illustrating a second example of the overlap between the design target element after linear mapping and the predetermined element of the core other than the design target element.

As illustrated in FIG. 6D, when a partial region of a design target element 250*k* after linear mapping overlaps a partial region of the predetermined element of the core other than the design target element (permanent magnet 220) in a manner to cross the predetermined element of the core other than the design target element (permanent magnet 220), as illustrated in the right-side view of FIG. 6D, the design target element change part 133 sets a plurality of the regions obtained by removing the region overlapping the predetermined element of the core other than the design target element (permanent magnet 220) from the region of the design target element 250*k* after linear mapping to new design target elements 250*m*, 250*l* after linear mapping. Further, the design target element change part 133 deletes the identification information ID3 intended for identifying the design target element from other elements (regions), which is set for each coordinate of the region overlapping the predetermined element of the core other than the design target element (permanent magnet 220).

Incidentally, in order to inhibit the increase in the number of design target elements, the design target element change part 133 may select only one of the new design target elements 250*m*, 250*l* after linear mapping. For example, the design target element change part 133 may select the largest design target element 250*l* after linear mapping out of the new design target elements 250*m*, 250*l* after linear mapping, and delete the other design target element 250*m* after linear mapping.

Figure 7:
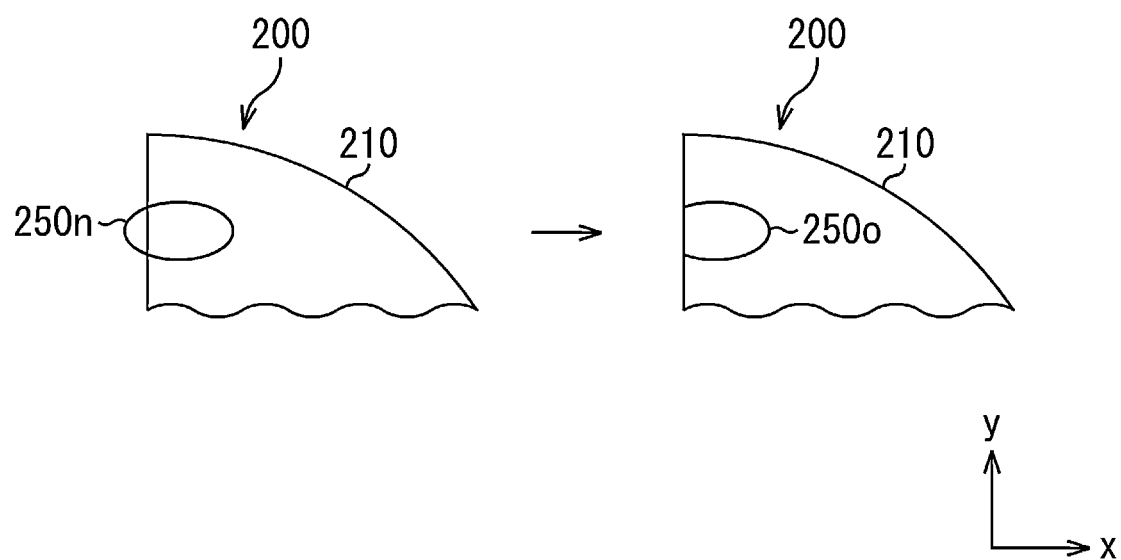
FIG. 7 is a view that explains one example of protrusion.

FIG. 7 is a view that explains one example of the protrusion.

As illustrated in the left-side view of FIG. 7, when a partial region of a design target element 250*n* after linear mapping protrudes from the design region 200 (iron core 210), the design target element change part 133 sets the region obtained by removing the region protruding from the design region 200 from the design target element 250*n* after linear mapping to a new design target element 250O after linear mapping.

When such overlap as illustrated in FIG. 6A, FIG. 6B, FIG. 6*c*, or FIG. 6D and such protrusion as illustrated in FIG. 7 occur simultaneously at one of the design target elements after linear mapping, for example, the design target element change part 133 may change the design target element after linear mapping as explained with reference to FIG. 6A to FIG. 6D, and remove, out of the region of the changed design target element, the region protruding from the design region 200 as explained with reference to FIG. 7.

In this embodiment, the design target element change part 133 individually executes changing all the design target elements 230*a*, 230*b* with the basic shape included in the design region 200 (core) to the design target elements 250*a*, 250*b* after linear mapping respectively for each of a plurality of the candidate solutions of the optimization parameter calculated by the parameter acquisition part 132 as above. As a result, cores as many as the number of candidate solutions of the optimization parameter can be obtained as the core with the design target elements 250*a*, 250*b* after linear mapping that are different.

<<Characteristic Value Calculation Part 134>>

The characteristic value calculation part 134 calculates a value indicating the characteristic of the device when the device including the core in which the shape of the design target element has been changed by the design target element change part 133 is operated. In this embodiment, there is explained, as an example, the case where the characteristic value calculation part 134 calculates, by performing a numerical analysis, a value indicating the characteristic of the device when the device including the core including the design target elements 250*a*, 250*b* after linear mapping calculated by the design target element change part 133 as the flux barrier is operated.

Examples of the characteristic of the device include, for example, an average torque of the rotor, an iron loss of the core, efficiency of the IPMSM, and so on. As above, the characteristic of the device is a concept that includes the characteristics of components forming the device. Thus, in this embodiment, there is explained, as an example, the case where the characteristic value calculation part 134 calculates a magnetic flux density vector B to be generated in the core when the core whose design target region has been changed is excited by performing a numerical analysis using the finite element method, and calculates the average torque of the rotor as a characteristic of the device based on the calculated result.

The characteristic value calculation part 134 calculates the magnetic flux density vector B and an eddy current vector $J_e$ in each minute region (mesh) using the finite element method based on the Maxwell equation according to electromagnetic field analysis conditions including excitation conditions.

Incidentally, as long as the magnetic flux density vector B and the eddy current vector $J_e$ in each minute region can be calculated, the electromagnetic field analysis may be performed using a method other than the finite element method (difference method or the like).

Basic equations for calculating the magnetic flux density vector B and the eddy current vector $J_e$ are generally given by (2) Equation to (5) Equation below.

[Mathematical equation 2]

$$\nabla \times \left(\frac{1}{\mu} \nabla \times \vec{A}\right) + \sigma \frac{\partial \vec{A}}{\partial t} + \sigma \nabla \phi = \vec{J_0} \quad (2)$$

$$\nabla \cdot \left(\sigma\left(\frac{\partial \vec{A}}{\partial t} + \nabla \phi\right)\right) = 0 \quad (3)$$

$$\vec{J_e} = -\sigma\left(\frac{\partial \vec{A}}{\partial t} + \nabla \phi\right) \quad (4)$$

$$\vec{B} = \nabla \times \vec{A} \quad (5)$$

In (2) Equation to (5) Equation, μ is magnetic permeability [H/m]. A is a vector potential [T·m]. σ is electrical conductivity [S/m]. $J_0$ is an exciting current density [A/m²]. φ is a scalar potential [V].

After the vector potential A and the scalar potential φ are calculated by solving (2) Equation and (3) Equation in conjunction, the magnetic flux density vector B and the eddy current vector $J_e$ are calculated from (4) Equation and (5) Equation.

The method of analyzing electromagnetic fields using the finite element method is a general method. Therefore, its detailed explanation is omitted here.

The characteristic value calculation part 134 calculates the torque in each minute region based on the magnetic flux density vector B in each minute region and calculates the average torque based on the calculated torque. Here, a torque F is calculated as being a Maxwell stress by (6) Equation below, for example.

[Mathematical equation 3]

$$F = \begin{bmatrix} F_x \\ F_y \end{bmatrix} = \int \mu_0 \begin{bmatrix} \left(B_x^2 - \frac{1}{2}B^2\right)n_x - (B_x B_y)n_y \\ (B_x B_y)n_x - \left(B_y^2 - \frac{1}{2}B^2\right)n_y \end{bmatrix} d\Gamma \quad (6)$$

In (6) Equation, $n_x$ and $n_y$ are unit vectors in the x-axis direction and the y-axis direction, respectively. $\mu_0$ is vacuum magnetic permeability. $\int d\Gamma$ indicates that it is a line integral along a closed curve surrounding an object whose electromagnetic force is found. Further, B is a magnitude of the magnetic flux density vector. $B_x$ and $B_y$ are an x-axis component and a y-axis component of the magnetic flux density vector, respectively.

As described previously, in this embodiment, the design target element change part 133 obtains cores as many as the number of candidate solutions of the optimization parameter as the core with the design target elements 250a, 250b after linear mapping that are different. Therefore, in this embodiment, the characteristic value calculation part 134 calculates the average torque of the rotor as one example of the characteristic of the device for each of the cores as many as the number of candidate solutions of the optimization parameter.

<<Determination Part 135>>

The determination part 135 determines the shape of the core based on the value indicating the characteristic of the device calculated by the characteristic value calculation part 134.

For example, when the values indicating the characteristic of the device calculated by the characteristic value calculation part 134 satisfy predetermined conditions, the determination part 135 determines, as the optimal solution, the candidate solution of the optimization parameter used in calculating the design target element (design target elements 250a, 250b after linear mapping in this embodiment) included in the core with the value indicating that the characteristic is the best among the values that satisfy the predetermined conditions. When the characteristic of the device is the average torque of the rotor, the predetermined condition is, for example, that the value of the average torque of the rotor is equal to or more than a predetermined value. The predetermined value is determined, for example, based on the value required by the IPMSM to be designed.

As described previously, in this embodiment, there is explained, as an example, the case where the core shape determination part 130 calculates the optimal solution of the optimization parameter using the genetic algorithm. Therefore, if there is no value that satisfies the predetermined condition among the values indicating the characteristic of the device calculated by the characteristic value calculation part 134, the parameter acquisition part 132 updates the candidate solutions of the optimization parameter that have already been calculated according to the genetic algorithm. Then, using the updated candidate solutions of the optimization parameter, pieces of the previously-described processing in the design target element change part 133, the characteristic value calculation part 134, and the determination part 135 are performed again.

Further, even if the number of times of repetition processing in the parameter acquisition part 132, the design target element change part 133, the characteristic value calculation part 134, and the determination part 135 described above exceeds a predetermined value, there may be no value that satisfies the predetermined condition among the values indicating the characteristic of the device calculated by the characteristic value calculation part 134. In this case, the determination part 135 determines, as the optimal solution, the candidate solution of the optimization parameter used in calculating the design target element included in the core with the value indicating that the characteristic is the best (the maximum value of the average torque of the rotor in this embodiment) among the values indicating the characteristic of the device calculated by the characteristic value calculation part 134, for example. As the predetermined value, a value commonly used in the genetic algorithm is employed.

<Output Part 140>

The output part 140 outputs information on the candidate solution of the optimization parameter determined by the determination part 135. The output part 140 outputs information that uniquely specifies the position, the shape, and the size of the design target element (design target elements 250a, 250b after linear mapping in this embodiment) calculated by changing the design target element 230 with the basic shape according to the optimal solution of the optimization parameter determined by the determination part 135, for example. For example, it is set that the design target elements 250a, 250b after linear mapping illustrated in FIG. 5C are the design target element calculated by changing the design target element 230 with the basic shape according to the optimal solution of the optimization parameter. In this case, the output part 140 may display an image displaying the iron core 210, the permanent magnet 220, and the design target elements 250*a*, 250*b* after linear mapping illustrated in FIG. 5C. As a form of output, for example, at least one of display on a computer display, storage in an internal or external storage medium of the core design apparatus 100, and transmission to an external device is employed. The position of the design target element may be any information that uniquely specifies the position of the design target element, and may also be, for example, the position of the center of gravity of the design target element. Further, a coordinate group indicating the outline of the design target element may be set as the information that uniquely specifies the position, the shape, and the size of the design target element.

The core is manufactured based on the information output by the output part 140. The design to be performed after the calculation of the optimal solution of the optimization parameter by the core design apparatus 100 may be performed by the designer. A part of the design to be performed after the calculation of the optimal solution of the optimization parameter by the core design apparatus 100 may be performed by the core design apparatus 100. The design of the core is completed when a design drawing of the core is produced. The design target element of the core in the design drawing may be the same as the optimal solution of the optimization parameter. Further, the design target element of the core in the design drawing does not have to be exactly the same as the optimal solution of the optimization parameter. For example, a part or all of the shape of the design target element indicated in the optimal solution of the optimization parameter may be simplified. That is, the final position, shape, and size of the design target element may be determined based on the optimal solution of the optimization parameter. The core is manufactured according to the design drawing. The design target element of the manufactured core is based on the optimal solution of the optimization parameter. For example, the number of design target elements in the manufactured core is the same as the number of design target elements indicated in the optimal solution of the optimization parameter. Further, for example, the design target element of the manufactured core is positioned in a region including the position of the center of gravity of the design target element indicated in the optimal solution of the optimization parameter. Further, the shape of the design target element of the manufactured core is the same as the shape of the design target element indicated in the optimal solution of the optimization parameter. However, the design target element of the manufactured core does not have to be exactly the same as the optimal solution of the optimization parameter. For example, the shape of the design target element of the manufactured core may be the shape obtained by simplifying a part or all of the shape of the design target element indicated in the optimal solution of the optimization parameter. In this case, the design target element of the manufactured core and the design target element indicated in the optimal solution of the optimization parameter may be the same in the direction in which the straight line mutually connecting the center line of the core and the position of the center of gravity of the design target element extends in a cross section cut perpendicular to the center line of the core. Further, the aspect ratio of the design target element of the manufactured core may be the same as the aspect ratio of the design target element indicated in the optimal solution of the optimization parameter. That is, the core (design target element) may be manufactured based on the optimal solution of the optimization parameter. As long as the position, the shape, and the size of the design target element are determined in the design drawing, the core manufacturing itself is performed using, for example, a well-known technique.

[Flowchart]

Figure 8B:
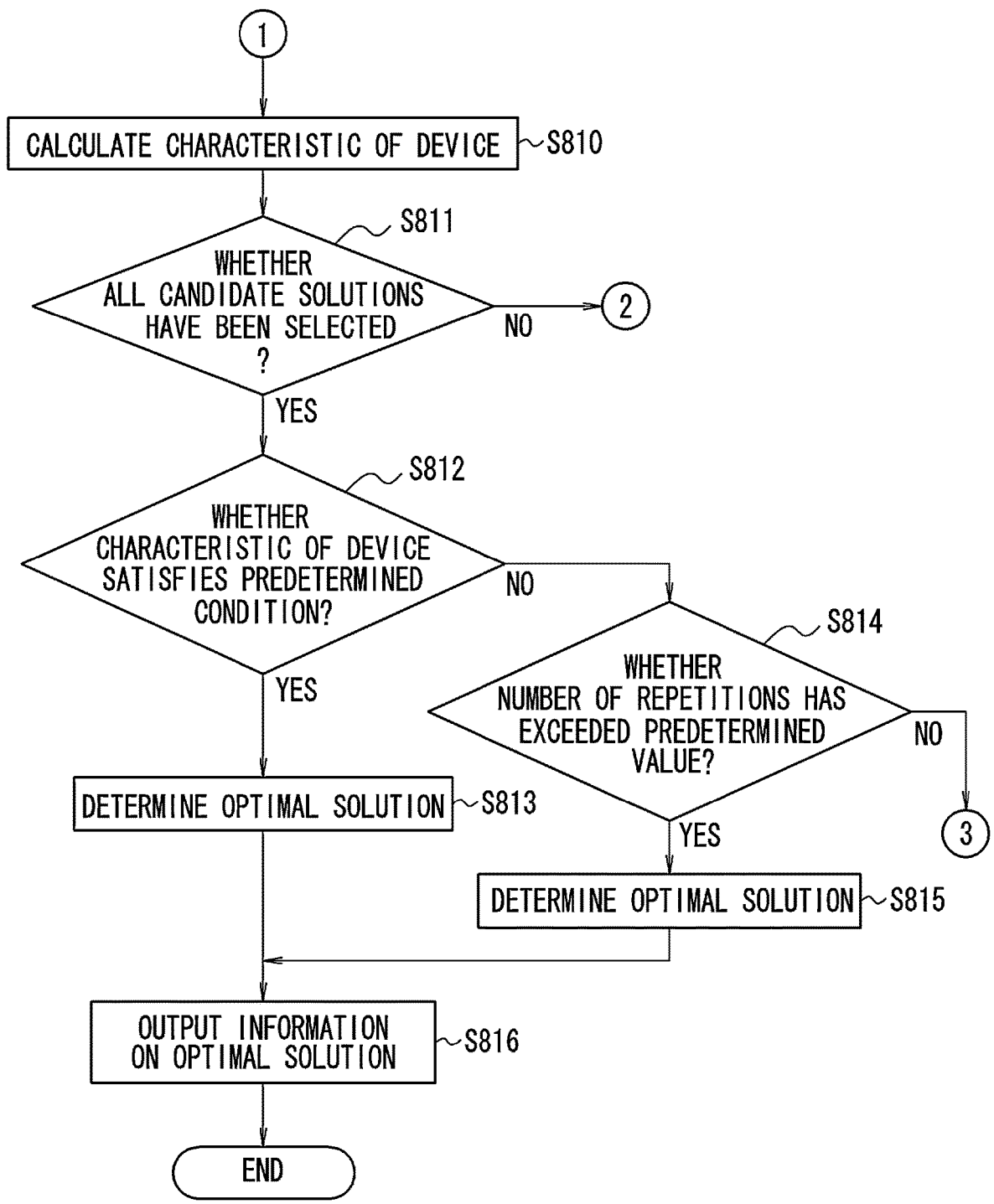
FIG. 8B is a flowchart following FIG. 8A.

Next, there is explained one example of a core design method with reference to a flowchart in FIG. 8A and FIG. 8B. The core design method is explained below, using, as an example, the case where the previously-described core design apparatus 100 executes the core design method.

First, at Step S801, the design source information acquisition part 110 acquires information on a core to be designed. In this embodiment, the design source information acquisition part 110 acquires information on the design region 200, which is the design target region of the core, information on the element of the core other than the design target element (permanent magnet 220), and a physical property value of each element of the core. Then, the design source information acquisition part 110 sets the design region 200 in the main memory (work area) and sets the element of the core other than the design target element (permanent magnet 220) in the design region 200. Further, the design source information acquisition part 110 sets the identification information ID1 for each coordinate of the design region 200 and sets the identification information ID2 for each coordinate of the region of the element of the core other than the design target element (permanent magnet 220).

Then, at Step S802, the basic shape acquisition part 120 acquires information on the design target elements 230*a*, 230*b* with the basic shape to set it in the design region 200. Then, the basic shape acquisition part 120 changes the identification information ID1 set for each coordinate of the design target elements 230*a*, 230*b* with the basic shape to the identification information ID3.

Then, at Step S803, the deformation pattern acquisition part 131 acquires information on the deformation patterns 310*a*, 310*b*. In this embodiment, there is explained, as an example, the case where the information on the deformation patterns 310*a*, 310*b* includes information indicating a displacement vector at each coordinate of the deformation pattern application regions 320*a*, 320*b*. Further, here, there is explained, as an example, the case where the deformation pattern acquisition part 131 acquires information on a plurality of types of the deformation patterns 310*a*, 310*b*.

Then, at Step S804, the parameter acquisition part 132 calculates candidate solutions of the optimization parameter (application parameter). In this embodiment, there is explained, as an example, the case where one candidate solution of the optimization parameter includes the type, the number of times of application, and the application order of deformation patterns 310*a*, 310*b*, and the linear mapping parameter. Further, in this embodiment, there is explained, as an example, the case where in the processing at Step S804 for the first time, the parameter acquisition part 132 calculates initial values of a plurality of candidate solutions as an initial value of the candidate solution of the optimization parameter using a well-known method performed in the genetic algorithm. Further, in this embodiment, there is explained, as an example, the case where in the processing at Step S804 for the second and subsequent times, the parameter acquisition part 132 updates the candidate solutions of the optimization parameter that have already been calculated according to the genetic algorithm.

Then, at Step S805, the design target element change part 133 selects one candidate solution of the optimization parameter for one design target element from among a plurality of the candidate solutions of the optimization parameter calculated at Step S804.

Then, at Step S806, the design target element change part 133 applies the deformation patterns 310a, 310b to the design target element according to the type, the number of times of application, and the application order of the deformation patterns 310a, 310b out of the application parameter included in the candidate solution of the optimization parameter selected at Step S805, to thereby change the shape of the design target element. The design target element change part 133 changes the shape of the design target element as above, to thereby calculate the design target element 240 after deformation due to the deformation pattern 310 (see FIG. 4A and FIG. 4B and FIG. 5B).

Then, at Step S807, the design target element change part 133 applies linear mapping to the design target elements 240c, 240d after deformed due to the deformation patterns 310a, 310b based on the linear mapping parameter out of the application parameter included in the candidate solution of the optimization parameter set for the design target element, to thereby calculate the design target elements 250a, 250b after linear mapping (see FIG. 5C).

Then, at Step S808, the design target element change part 133 determines whether or not there is a design target element where overlap·protrusion has occurred at the design target elements 250a, 250b after linear mapping. As a result of this determination, when there are no design target element 250a or 250b after linear mapping where overlap·protrusion has occurred (NO at Step S808), the processing at Step S809 is omitted, and processing at Step S810 in FIG. 8B, which will be described later, is performed. On the other hand, when there is at least one design target element 250a or 250b after linear mapping where overlap·protrusion has occurred (YES at Step S808), the processing at Step S809 is performed.

At Step S809, the design target element change part 133 changes the design target elements 250a, 250b after linear mapping again so that the overlap•overflow at the design target elements 250a, 250b after linear mapping that have overlapped•protruded are eliminated (see FIG. 6A to FIG. 6D and FIG. 7).

Then, at Step S810, the characteristic value calculation part 134 calculates values indicating the characteristic of the device when the device including the core including the design target elements 250a, 250b after linear mapping calculated at Step S807 and S809 as flux barriers is operated. In this embodiment, the characteristic value calculation part 134 calculates the average torque of the rotor as the characteristic of the device.

Then, at Step S811, the determination part 135 determines whether or not all the candidate solutions of the optimization parameter calculated at Step S804 have been selected. When the number of design target elements is one, at Step S811, the determination part 135 determines whether or not all the candidate solutions of the optimization parameter calculated at Step S804 have been selected. When the number of design target elements is plural, at Step S811, the determination part 135 determines whether or not all the possible combinations as the combination of the candidate solutions as many as the number of design target elements have been selected from among a plurality of the candidate solutions of the optimization parameter calculated at Step S804, for example.

As a result of this determination, when all the candidate solutions of the optimization parameter calculated at Step S804 have not been selected (NO at Step S811), the processing at Step S805 is performed again. Then, at Step S805, an unselected candidate solution is selected. Then, at Steps S805 to S809, the design target elements 250a, 250b after linear mapping are calculated based on the unselected candidate solution. Then, at Step S810, the values indicating the characteristic of the device when the device including the core including the design target elements 250a, 250b after linear mapping as flux barriers is operated are calculated.

As above, at Step S811, when it is determined that all the candidate solutions of the optimization parameter calculated at Step S804 have been selected (YES at Step S811), the processing at Step S812 is performed. At Step S812, the determination part 135 determines whether or not there is a value that satisfies a predetermined condition among the values indicating the characteristic of the device calculated at Step S810. In this embodiment, there is explained, as an example, the case where the condition that the value of the average torque of the rotor is equal to or more than a predetermined value is the predetermined condition.

As a result of this determination, when there is a value that satisfies a predetermined condition among the values indicating the characteristic of the device calculated at Step S810 (YES at Step S812), the processing at Step S813 is performed. At Step S813, the determination part 135 determines, as the optimal solution, the candidate solution of the optimization parameter used in calculating the design target elements 250a, 250b after linear mapping included in the core with the value indicating that the characteristic is the best among the values indicating the characteristic of the device that satisfy the predetermined conditions. In this embodiment, the determination part 135 determines, as the optimal solution, the candidate solution of the optimization parameter used in calculating the design target elements 250a, 250b after linear mapping included in the core indicating that the value of the average torque of the rotor is the maximum value. Then, the processing at Step S816 to be described later is executed.

As a result of the determination at Step S812, when there is no value that satisfies the predetermined condition among the values indicating the characteristic of the device calculated at Step S810 (NO at Step S812), the processing at Step S814 is performed. At Step S814, the determination part 135 determines whether or not the number of times of repetition processing at Steps S804 to S812 has exceeded a predetermined value. For example, a value commonly used in the genetic algorithm is used as the predetermined value. As a result of this determination, when the number of times of repetition does not exceed the predetermined value (NO at Step S814), the processing at Step S804 is performed again. The processing at Step S804 performed in this manner becomes the processing at Step S804 for the second and subsequent times. As described previously, at Step S804 for the second and subsequent times, the parameter acquisition part 132 updates the candidate solutions of the optimization parameter that have already been calculated according to the genetic algorithm. Pieces of the processing at Steps S805 to S812 described previously are performed again using the candidate solutions of the optimization parameter updated in this manner.

As a result of the determination at Step S814, when the number of times of repetition processing at Steps S804 to S812 has exceeded the predetermined value (YES at Step S814), the processing at Step S815 is performed. At Step S815, the determination part 135 determines, as the optimal solution, the candidate solution of the optimization parameter used in calculating the design target elements 250a, 250b after linear mapping included in the core with the value indicating that the characteristic is the best among the values of the characteristic of the device calculated in the previous repetition processing at Steps S804 to S812. Then, the processing at Step S816 is performed.

At Step S816, the output part 140 outputs information on the candidate solution of the optimization parameter determined at Step S813 or S815. After the processing at Step S816 is finished, the processing by the flowchart in FIG. 8A and FIG. 8B is finished.

[Hardware of the Core Design Apparatus 100]

Figure 9:
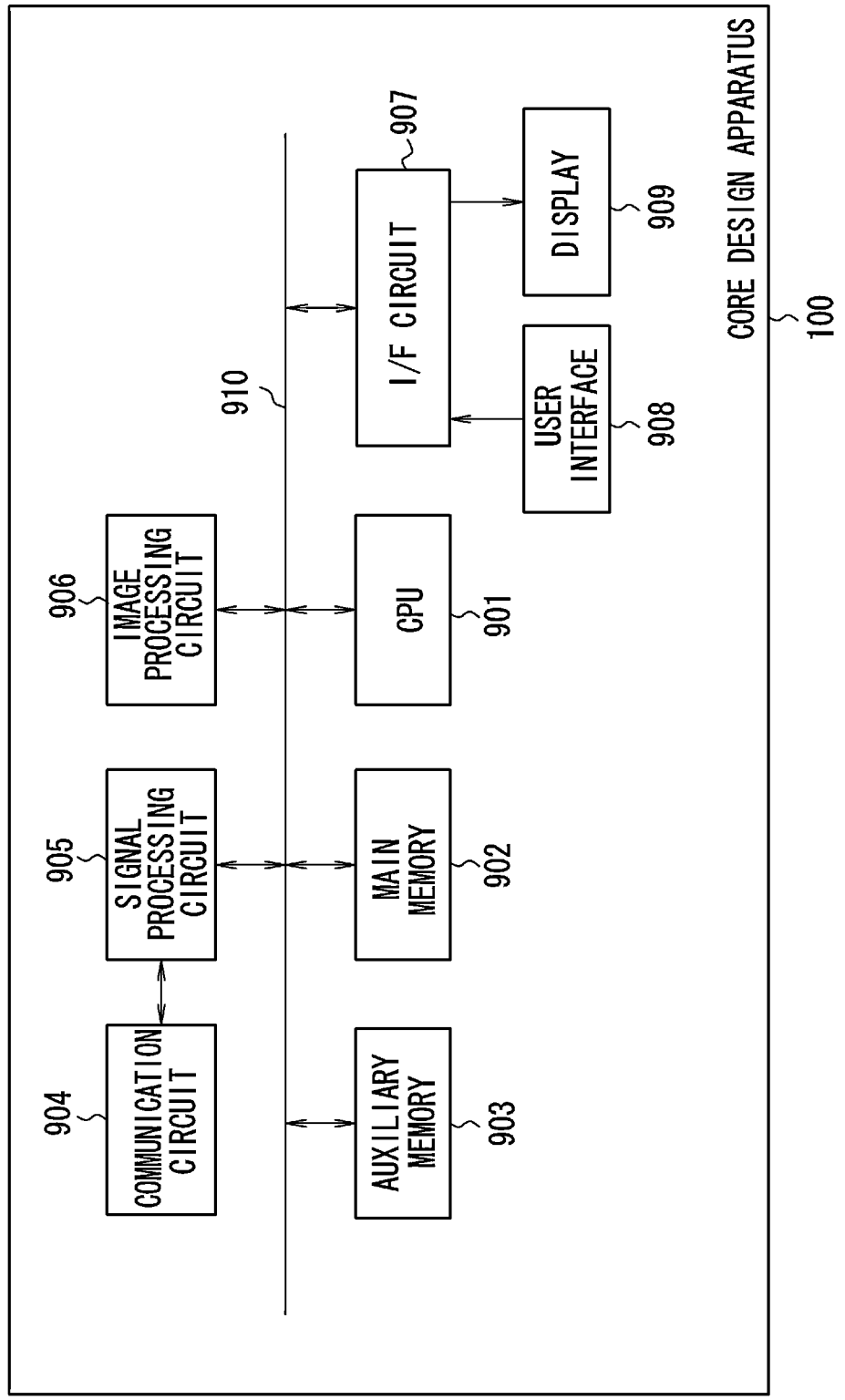
FIG. 9 is a diagram illustrating one example of a configuration of hardware of a core design apparatus.

Next, there is explained one example of the hardware of the core design apparatus 100. In FIG. 9, the core design apparatus 100 includes a CPU 901, a main memory 902, an auxiliary memory 903, a communication circuit 904, a signal processing circuit 905, an image processing circuit 906, an I/F circuit 907, a user interface 908, a display 909, and a bus 910.

The CPU 901 overall controls the entire core design apparatus 100. The CPU 901 uses the main memory 902 as a work area to execute a program stored in the auxiliary memory 903. The main memory 902 stores data temporarily. The auxiliary memory 903 stores various data, in addition to programs to be executed by the CPU 901.

The communication circuit 904 is a circuit intended for performing communication with the outside of the core design apparatus 100. The communication circuit 904 may perform radio communication or wire communication with the outside of the core design apparatus 100.

The signal processing circuit 905 performs various pieces of signal processing on signals received in the communication circuit 904 and signals input according to the control by the CPU 901.

The image processing circuit 906 performs various pieces of image processing on signals input according to the control by the CPU 901. The signal that has been subjected to the image processing is output on the display 909, for example.

The user interface 908 is a part in which an operator OP gives an instruction to the core design apparatus 100. The user interface 908 includes buttons, switches, dials, and so on, for example. Further, the user interface 908 may include a graphical user interface using the display 909.

The display 909 displays an image based on a signal output from the image processing circuit 906. The I/F circuit 907 exchanges data with a device connected to the I/F circuit 907. In FIG. 9, as the device to be connected to the I/F circuit 907, the user interface 908 and the display 909 are illustrated. However, the device to be connected to the I/F circuit 907 is not limited to these. For example, a portable storage medium may be connected to the I/F circuit 907. Further, at least a part of the user interface 908 and the display 909 may be provided outside the core design apparatus 100.

Incidentally, the CPU 901, the main memory 902, the auxiliary memory 903, the signal processing circuit 905, the image processing circuit 906, and the I/F circuit 907 are connected to the bus 910. Communication among these components is performed via the bus 910. Further, the hardware of the core design apparatus 100 is not limited to the hardware illustrated in FIG. 9 as long as it can perform the previously-described functions of the core design apparatus 100. For example, a GPU may be used as a processor instead of or in addition to the CPU 901.

[Calculation Example]

Figure 10A:
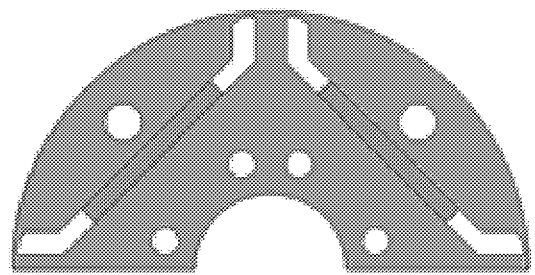
FIG. 10A is a view illustrating one example of a core before design.
Figure 10B:
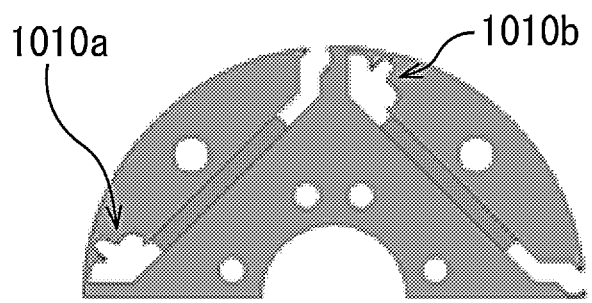
FIG. 10B is a view illustrating a comparative example of the core after design.
Figure 10C:
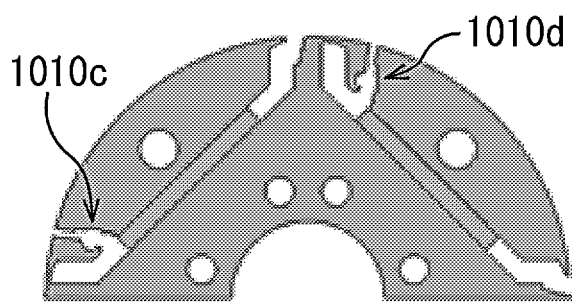
FIG. 10C is a view illustrating an invention example of the core after design.

Next, there are explained calculation examples. FIG. 10A to FIG. 10C are views illustrating a core before design and a core after design.

FIG. 10A illustrates an original shape of the core. In this calculation example, the addition of a flux barrier to the core illustrated in FIG. 10A was performed using the method described in Patent Literature 1 and the method explained in this embodiment.

As described above, a calculation target element in this calculation example is the flux barrier. In FIG. 10A to FIG. 10C, the region of the flux barrier is a white region that is not circular. The region of the iron core and the region of the permanent magnet are gray regions that are different from each other in concentration (the region of the permanent magnet is rectangular). Incidentally, six circular white regions illustrated in FIG. 10A to FIG. 10C are predetermined elements of the core other than the design target element (elements whose shape is not changed).

In this calculation example, the region surrounded by the outer edge of the region of the iron core in FIG. 10A (an annular sector-shaped region with a central angle of 180° in FIG. 10A) was set as a design region. Then, eight circular regions were set as the basic shape of the flux barrier, which is the design target element, in the region within the design region and on the outer periphery side relative to the permanent magnet. Incidentally, in FIG. 10A to FIG. 10C, the basic shape of the flux barrier is not illustrated. That is, as described previously, the six circular white regions illustrated in FIG. 10A to FIG. 10C are the predetermined elements of the core other than the design target element (elements whose shape is not changed), and are different from the basic shape of the flux barrier.

Further, in this calculation example, the average torque when the core was excited with an exciting current with an effective value of 25 A and a lead angle of 20° was used as the characteristic of the device. The shape of the design target element that maximizes the average torque was searched for by a genetic algorithm. FIG. 10B illustrates a comparative example. The comparative example in FIG. 10B illustrates the result obtained by applying only the linear mapping to the design target element with the basic shape as described in Patent Literature 1. FIG. 10C illustrates an invention example. The invention example in FIG. 10C illustrates the result obtained by performing the changes due to the deformation patterns 310a, 310b and the linear mapping on the design target element after deformation due to the deformation patterns 310a, 310b, as explained in this embodiment. In the invention example, the deformation patterns 310a, 310b having, as the deformation pattern application regions 320a, 320b, a square region whose one side length is four times the diameter of the circle with the basic shape were used.

When the average torque of the rotor in the case of using the core illustrated in FIG. 10A was set to 100, the average torque of the rotor in the case of using the core in the comparative example illustrated in FIG. 10B was 109.4 (the value of the average torque explained in this calculation example is a value made dimensionless). In contrast to this, the average torque of the rotor in the case of using the core in the invention example illustrated in FIG. 10C was 111.4. Thus, it can be seen that the method in this embodiment (invention example) can improve the average torque of the rotor more than the method described in Patent Literature 1 (comparative example). A comparison between regions 1010a and 1010b each at the tip of the flux barrier in the comparative example illustrated in FIG. 10B and regions 1010c and 1010d each at the tip of the flux barrier in the invention example illustrated in FIG. 10c reveals that a flux barrier with a shape that is thinner in the region at the tip is formed in the invention example as compared to the comparative example. This is considered to be one of the reasons why the method in this embodiment (invention example)

improves the average torque of the rotor more than the method described in Patent Literature 1 (comparative example). Further, as illustrated in FIG. 10C, in the method in this embodiment (invention example), even if nonlinear mapping was applied to the basic shape of the design target element (flux barrier), the flux barrier obtained as the optimal solution was distributed in a somewhat solid manner, resulting in that it was possible to prevent the flux barrier from becoming an extremely complex shape.

[Summary]

As above, in this embodiment, the core design apparatus 100 acquires the design target element 230 with the basic shape, the deformation patterns 310a, 310b, and the application parameter. The deformation patterns 310a, 310b indicate the content of the deformation to the shape of the design target element and indicate the displacement at each position in the relative coordinate system on the basic shape of the design target element. Further, at least one of the deformation patterns 310a, 310b indicates the content of the deformation in which the shapes before and after change are brought into a homeomorphic mapping relationship. The application parameter includes the parameter indicating the application method of the deformation patterns 310a, 310b when applying the deformation patterns 310a, 310b to the design target elements 230a, 230b. The core design apparatus 100 applies nonlinear mapping to the design target element 230 by applying the deformation patterns 310a, 310b to the design target element according to the application method of the deformation patterns 310a, 310b included in the application parameter, thereby changing the shape of the design target elements 230a, 230b. Then, the core design apparatus 100 calculates the values indicating the characteristic of the device when the device including the core in which the shapes of the design target elements 230a, 230b have been changed is operated, and determines the shape of the core based on the calculated values. Thus, it is possible to search for the shape of the core that improves the performance of the device by setting a wider range within a feasible range as a search region.

Further, in this embodiment, all the deformation patterns 310a, 310b indicate the content of the deformation in which the shapes before and after change are brought into a homeomorphic mapping relationship. Therefore, the homeomorphic property of the design target elements before and after deformation can be reliably preserved.

Further, in this embodiment, the application method of the deformation pattern includes the number of times the deformation patterns 310a, 310b are applied to the design target element. Further, the application method of the deformation patterns 310a, 310b includes the application order of a plurality of types of the deformation patterns 310a, 310b to be applied to the design target element. Therefore, it is possible to search for the shape of the design target element that improves the characteristic of the device from within a search region in a wide range while preserving the homeomorphic property of the design target elements before and after deformation.

Further, in this embodiment, the application parameter further includes the linear mapping parameter, which is the parameter to be used for applying the linear mapping to the design target element. The core design apparatus 100 performs applying the deformation patterns 310a, 310b to the design target element according to the application method of the deformation patterns 310a, 310b to change the shape of the design target element and applying the linear mapping to the design target element. Accordingly, it is possible to search for the shape of the core that improves the performance of the device from a search region in a wider range (as long as the calculation time is the same).

Further, in this embodiment, the core design apparatus 100 uses the application parameter as the optimization parameter and calculates the optimal solution of the optimization parameter using the optimization problem algorithm. Thus, it becomes unnecessary for the designer, for example, to determine the application parameter by trial and error, resulting in that the burden on the designer can be reduced.

Further, in this embodiment, the core design apparatus 100 determines the optimal solution of the optimization parameter by the metaheuristic method. Thus, it is possible to inhibit the optimal solution from being calculated as a local solution, and it becomes easier to obtain a novel shape as the shape of the core.

MODIFIED EXAMPLE

First Modified Example

In this embodiment, there has been explained, as an example, the case where the design region 200 is a region surrounded by the outer edge of the iron core 210. In this case, as illustrated in FIG. 10C, the flux barrier may reach an outer peripheral portion of the iron core. If the flux barrier reaches the outer peripheral portion of the iron core in the rotor, the rotor may break due to the centrifugal force that the rotor receives as it rotates. Therefore, a region excluding an end portion of the iron core 210 and a region near the end portion of the iron core 210 may be set as the design region. In this case, it is possible to inhibit the core that does not satisfy the specifications of the device from being designed without performing complex calculations.

Further, instead of or in addition to setting the design region in this way, the following may be set. In other words, the core shape determination part 130 solves a direct problem in which an electromagnetic field analysis and a stress analysis are coupled, to thereby calculate a magnetic flux density vector and a stress vector in each minute region, and thereby analyzes the stress generated in the core due to the centrifugal force that the rotor receives as it rotates. Then, the core shape determination part 130 searches for the optimal solution of the optimization parameter based on both the characteristic of the device based on the magnetic flux density vector and the characteristic of the device based on the stress vector.

For example, the core shape determination part 130 uses the finite element method to calculate the stress vector to be applied to each minute region (mesh) of the core according to stress conditions. The method of performing the stress analysis by the finite element method is a common method. Incidentally, if the stress vector in each minute region (mesh) can be calculated by a numerical analysis, a method other than the finite element method (difference method or the like) may be used as the method of calculating the stress vector.

When the minute region used in the electromagnetic field analysis (calculation of the magnetic flux density vector B and the eddy current vector $J_e$ in each minute region) explained in this embodiment is different from the minute region used in the stress analysis, the core shape determination part 130 calculates the stress vector in the minute region used in the electromagnetic field analysis, for example, by performing interpolation processing on the stress vector in each minute region used in the stress analysis.

In the electromagnetic field analysis (calculation of the magnetic flux density vector B and the eddy current vector $J_e$ in each minute region), a BH curve corresponding to stress is used as a BH curve. The electromagnetic field analysis is performed using the BH curve corresponding to the stress vector in a minute region used in the electromagnetic field analysis.

For example, the value of the characteristic of the device determined based on the result of the electromagnetic field analysis is set to V1. Further, the weight coefficient for the characteristic of the device determined based on the result of the electromagnetic field analysis is set to W1 (>0). Further, the value of the characteristic of the device determined based on the result of the stress analysis is set to V2. Further, the weight coefficient for the characteristic of the device determined based on the result of the stress analysis is set to W2 (>0). In this case, the core shape determination part 130 searches for mapping such that the value of W1×V1+W2×V2 becomes the maximum or minimum. Incidentally, when the larger value of the characteristic of the device determined from the result of the electromagnetic field analysis indicates better characteristic, and the smaller value of the weight coefficient for the characteristic of the device determined from the result of the stress analysis indicates better characteristic, the core shape determination part 130 (determination part 135) may search for an optimization parameter such that −W1×V1+W2×V2 becomes the minimum, for example.

Incidentally, the direct problem in which the electromagnetic field analysis and the stress analysis are coupled can be realized by a well-known method described in Patent Literature 1, for example. Therefore, its detailed explanation is omitted here. Further, depending on the characteristic of the device and other factors to be considered when designing the core, only the stress analysis may be performed without performing the electromagnetic field analysis.

Second Modified Example

In this embodiment, there has been explained, as an example, the case where the genetic algorithm is used as the optimization problem algorithm. However, the optimization problem algorithm is not limited to the genetic algorithm. The metaheuristic method other than the genetic algorithm may be used. Using the metaheuristic method is preferable because it can inhibit the optimal solution from being calculated as a local solution and also makes it easier to obtain a novel shape. However, an optimization problem algorithm other than the metaheuristic method such as a gradient method may also be used. Further, solving the optimal solution problem with the application parameter set as the optimization parameter makes it possible to design a core that exhibits better values as the values that indicate the characteristic of the device, which is preferable. However, it is not always necessary to solve the optimal solution problem with the application parameter set as the optimization parameter. For example, the designer may vary the application parameter by trial and error to search for the application parameter that the value indicating the characteristic of the device satisfies a predetermined condition (for example, the value indicating the characteristic of the device is a better value than a predetermined value).

Third Modified Example

In this embodiment, there has been explained, as an example, the case where the shape of the rotor of the IPMSM is designed. However, the core to be designed is not limited to the core of the rotor of the IPMSM. For example, the core of a rotor of a squirrel-cage induction motor may be set as the core to be designed. In this case, a conductor bar embedded in an iron core forming the core may be set as a design target element. Further, the core of a stator may be set as the core to be designed. In this case, for example, a space in a recess formed in a tip surface of teeth of an iron core (surface facing a core of a rotor) that forms the core of the stator may be set as a design target element. In addition, the core of a rotor or the core of a stator of a generator, which is a rotary electric machine other than a motor, may be set as the core to be designed, or the core of a transformer may be set as the core to be designed.

Fourth Modified Example

In this embodiment, there has been explained, as an example, the case where all the deformation patterns 310a, 310b indicate the content of the deformation in which the shapes before and after change are brought into a homeomorphic mapping relationship. In this way, the homeomorphic property of the design target elements before and after deformation can be preserved. Therefore, for example, each time the shape of the design target element is changed, the shapes before and after change can be brought into a homeomorphic mapping relationship. Therefore, it is possible to change the shape of the design target element within a feasible range as much as possible, which is preferable. However, as long as at least one of the deformation patterns 310a, 310b indicates the content of the deformation in which the shapes before and after change are brought into a homeomorphic mapping relationship, a deformation pattern that does not indicate the content of the deformation in which the shapes before and after change are brought into a homeomorphic mapping relationship may be included in the deformation patterns 310a, 310b. In such a case, for example, the following may be set. First, the core design apparatus 100 determines whether or not the basic shape of the design target element and the finally obtained shape of the design target element are in a homeomorphic mapping relationship. Then, when the basic shape of the design target element and the finally obtained shape of the design target element are not in a homeomorphic mapping relationship, the core design apparatus 100 changes the application method of the deformation patterns 310a, 310b (for example, at least one of the content, the number, and the application order of the deformation patterns 310a, 310b) and performs the search for the optimal solution of the shape of the design target element again. Further, the core design apparatus 100 may display information on the finally obtained shape of the design target element on a display device and present it to the designer. In such a case, the designer may instruct the core design apparatus 100 to search again for the optimal solution of the shape of the design target element when the finally obtained shape of the design target element is not a feasible shape. Incidentally, as long as the finally obtained shape of the design target element is a feasible shape, the designer may employ the shape even when the design target elements before and after deformation are not brought into a homeomorphic mapping relationship. Thus, the design target elements before and after deformation do not have to preserve a homeomorphic property. Further, for example, when it is clear that the portion that does not have a feasible shape is a portion having a low effect on the characteristic of the device, the designer himself/herself may change the finally obtained shape of the design target element.

Other Modified Examples

Incidentally, the core design apparatus and the core design method explained in the embodiments of the present invention explained above can be implemented by causing a computer to execute a program. Further, a computer-readable recording medium in which the aforementioned program is recorded and a computer program product such as the aforementioned program can also be applied as the embodiment of the present invention. Incidentally, the computer-readable recording medium refers to a non-temporary recording medium. As the recording medium, it is possible to use a flexible disk, a hard disk, an optical disk, a magneto-optic disk, a CD-ROM, a magnetic tape, a non-volatile memory card, a ROM, or the like, for example.

Further, the embodiments of the present invention explained above merely illustrates concrete examples of implementing the present invention, and the technical scope of the present invention is not to be construed in a restrictive manner by the embodiment. That is, the present invention may be implemented in various forms without departing from the technical spirit or main features thereof.

INDUSTRIAL APPLICABILITY

The present invention can be used for designing a device including a core (iron core), for example.

The invention claimed is:

1. A core design apparatus for performing calculations related to design of a shape of a core, the core design apparatus comprising:
a computer processor including processing circuitry that:
acquires a basic shape of a design target element of the core; and
determines a shape of the core by changing a shape of the design target element of the core from the basic shape,
wherein the computer processor further:
acquires a deformation pattern indicating content of deformation to the shape of the design target element;
acquires an application parameter;
changes the shape of the design target element by using the deformation pattern and the application parameter;
calculates a value indicating a characteristic of a device when the device including the core in which the shape of the design target element has been changed is operated;
determines the shape of the core based on the value indicating the characteristic of the device; and
outputs information that uniquely specifies a position, the shape, and a size of the design target element based on a result of the determining of the shape of the core;
wherein the output information is utilized to manufacture the core,
wherein the application parameter includes a parameter indicating an application method of the deformation pattern when the deformation pattern is applied to the design target element,
wherein the computer processor applies nonlinear mapping to the design target element by applying the deformation pattern to the design target element according to the application method,
wherein the deformation pattern indicates displacement at each position in a relative coordinate system on the basic shape of the design target element, and
at least one of the deformation patterns indicates content of deformation in which shapes before and after change are brought into a homeomorphic mapping relationship.

2. The core design apparatus according to claim 1, wherein
the deformation patterns indicate the content of the deformation in which the shapes before and after change are brought into the homeomorphic mapping relationship.

3. The core design apparatus according to claim 2, wherein
the application method of the deformation pattern includes at least one of the number of times the deformation pattern is applied to the design target element and an application order in which a plurality of types of the deformation patterns are applied to the design target element.

4. The core design apparatus according to claim 2, wherein the application parameter further includes a linear mapping parameter being a parameter to be used for applying linear mapping to the design target element, and
wherein the computer processor further applies linear mapping to the design target element.

5. The core design apparatus according to claim 2, wherein
the computer processor calculates, with the application parameter set as an optimization parameter, an optimal solution of the optimization parameter by using an optimization problem algorithm.

6. The core design apparatus according to claim 5, wherein the optimization problem algorithm is an algorithm by a metaheuristic method,
wherein the computer processor calculates a candidate solution of the optimization parameter, and
wherein the computer processor determines, as the optimal solution of the optimization parameter, a candidate solution of the optimization parameter when a value indicating a characteristic of the device satisfies a predetermined condition.

7. The core design apparatus according to claim 2, wherein
the design target element includes at least one of a flux barrier and a permanent magnet in a rotor of a rotary electric machine.

8. A non-transitory computer-readable storage medium storing a program for causing a computer to function as core design apparatus according to claim 2.

9. The core design apparatus according to claim 2, wherein
the application method of the deformation pattern includes at least one of the number of times the deformation pattern is applied to the design target element and an application order in which a plurality of types of the deformation patterns are applied to the design target element.

10. The core design apparatus according to claim 9, wherein the application parameter further includes a linear mapping parameter being a parameter to be used for applying linear mapping to the design target element, and wherein the computer processor further applies linear mapping to the design target element.

11. The core design apparatus according to claim 2, wherein the application parameter further includes a linear mapping parameter being a parameter to be used for applying linear mapping to the design target element, and
wherein the computer processor further applies linear mapping to the design target element.

12. The core design apparatus according to claim 1, wherein
the application method of the deformation pattern includes at least one of the number of times the deformation pattern is applied to the design target element and an application order in which a plurality of types of the deformation patterns are applied to the design target element.

13. The core design apparatus according to claim 12, wherein the application parameter further includes a linear mapping parameter being a parameter to be used for applying linear mapping to the design target element, and
wherein the computer processor further applies linear mapping to the design target element.

14. The core design apparatus according to claim 1, wherein the application parameter further includes a linear mapping parameter being a parameter to be used for applying linear mapping to the design target element, and
wherein the computer processor further applies linear mapping to the design target element.

15. The core design apparatus according to claim 1, wherein
the computer processor calculates, with the application parameter set as an optimization parameter, an optimal solution of the optimization parameter by using an optimization problem algorithm.

16. The core design apparatus according to claim 15, wherein the optimization problem algorithm is an algorithm by a metaheuristic method,
wherein the processor calculates a candidate solution of the optimization parameter, and
wherein the computer processor determines, as the optimal solution of the optimization parameter, a candidate solution of the optimization parameter when a value indicating a characteristic of the device satisfies a predetermined condition.

17. The core design apparatus according to claim 1, wherein
the design target element includes at least one of a flux barrier and a permanent magnet in a rotor of a rotary electric machine.

18. A core design method of performing calculations related to design of a shape of a core with a computer, wherein the computer executes a basic shape acquisition step of acquiring a basic shape of a design target element of the core and a core shape determination step of determining a shape of the core by changing a shape of the design target element of the core from the basic shape,
wherein the core shape determination step includes:
a deformation pattern acquisition step of acquiring a deformation pattern indicating content of deformation to the shape of the design target element;
a parameter acquisition step of acquiring an application parameter;
a design target element change step of changing the shape of the design target element by using the deformation pattern and the application parameter;
a characteristic value calculation step of calculating a value indicating a characteristic of a device when the device including the core in which the shape of the design target element has been changed is operated;
a determination step of determining the shape of the core based on the value indicating the characteristic of the device; and
an output step of outputting information that uniquely specifies a position, the shape, and a size of the design target element based on a result of the determining of the shape of the core;
wherein the output information is utilized to manufacture core,
wherein the application parameter includes a parameter indicating an application method of the deformation pattern when the deformation pattern is applied to the design target element,
wherein the design target element change step applies nonlinear mapping to the design target element by applying the deformation pattern to the design target element according to the application method,
wherein the deformation pattern indicates displacement at each position in a relative coordinate system on the basic shape of the design target element, and
at least one of the deformation patterns indicates content of deformation in which shapes before and after change are brought into a homeomorphic mapping relationship.

19. A non-transitory computer-readable storage medium recording a program, executable by a computer processor including processing circuitry, for causing a computer to perform calculations related to design of a shape of a core, the program causing a computer to execute:
acquiring a basic shape of a design target element of the core; and
determining a shape of the core by changing a shape of the design target element of the core from the basic shape;
wherein the program executes;
acquiring a deformation pattern indicating content of deformation to the shape of the design target element;
acquiring an application parameter;
changing the shape of the design target element by using the deformation pattern and the application parameter;
calculating a value indicating a characteristic of a device when the device including the core in which the shape of the design target element has been changed is operated;
determining the shape of the core based on the value indicating the characteristic of the device; and
outputting information that uniquely specifies a position, the shape, and a size of the design target element based on a result of the determining of the shape of the core;
wherein the output information is utilized to manufacture the core,
wherein the application parameter includes a parameter indicating an application method of the deformation pattern when the deformation pattern is applied to the design target element,
wherein the program executes applying nonlinear mapping to the design target element by applying the deformation pattern to the design target element according to the application method, wherein the deformation pattern indicates displacement at each position in a relative coordinate system on the basic shape of the design target element, and at least one of the deformation patterns indicates content of deformation in which shapes before and after change are brought into a homeomorphic mapping relationship.

* * * * *

UNITED STATES PATENT AND TRADEMARK OFFICE
CERTIFICATE OF CORRECTION

PATENT NO. : 12,299,355 B2
APPLICATION NO. : 18/724149
DATED : May 13, 2025
INVENTOR(S) : Rei Honma Page 1 of 1

It is certified that error appears in the above-identified patent and that said Letters Patent is hereby corrected as shown below:

In the Claims

Column 39, Line 43, in Claim 16:
Change:
"wherein the processor calculates a candidate solution of"
To:
--wherein the computer processor calculates a candidate solution of--

Column 40, Lines 16 and 17, in Claim 18:
Change:
"wherein the output information is utilized to manufacture core,"
To:
--wherein the output information is utilized to manufacture the core,--

Signed and Sealed this
Fifth Day of August, 2025

Coke Morgan Stewart
*Acting Director of the United States Patent and Trademark Office*